US012090617B2

(12) United States Patent
Yoshikane et al.

(10) Patent No.: US 12,090,617 B2
(45) Date of Patent: Sep. 17, 2024

(54) POWER TOOL

(71) Applicant: MAKITA CORPORATION, Anjo (JP)

(72) Inventors: Kiyonobu Yoshikane, Anjo (JP); Hajime Takeuchi, Anjo (JP); Yoshiro Tada, Anjo (JP); Masanori Furusawa, Anjo (JP); Masao Miwa, Anjo (JP); Shinji Onoda, Anjo (JP); Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 79 days.

(21) Appl. No.: 18/103,507

(22) Filed: Jan. 31, 2023

(65) Prior Publication Data

US 2023/0173652 A1 Jun. 8, 2023

Related U.S. Application Data

(60) Division of application No. 17/473,054, filed on Sep. 13, 2021, now Pat. No. 11,597,068, which is a (Continued)

(30) Foreign Application Priority Data

Feb. 1, 2013 (JP) ................................ 2013-018845
Feb. 1, 2013 (JP) ................................ 2013-018846
(Continued)

(51) Int. Cl.

| | |
|---|---|
| ***B25D 16/00*** | (2006.01) |
| ***B25D 17/00*** | (2006.01) |
| ***B25F 5/02*** | (2006.01) |

(52) U.S. Cl.

CPC ................ *B25D 16/00* (2013.01); *B25F 5/02* (2013.01)

(58) Field of Classification Search

CPC .......... B25F 5/02; H01M 50/20; B25D 17/00
(Continued)

(56) References Cited

U.S. PATENT DOCUMENTS 4,084,123 A 4/1978 Lineback et al.
4,779,687 A 10/1988 Schreiber et al.
(Continued)

FOREIGN PATENT DOCUMENTS

DE 3844093 A1 7/1990
DE 202008014976 U1 2/2009
(Continued)

OTHER PUBLICATIONS

Office Action from the German Patent Office dispatched Feb. 14, 2023 in related German application No. 11 2014 000 639.4, and translation thereof.
(Continued)

*Primary Examiner* — Gloria R Weeks
(74) *Attorney, Agent, or Firm* — J-TEK LAW PLLC; Jeffrey D. Tekanic; Scott T. Wakeman

(57) ABSTRACT

A power tool, such as a hammer drill (100), has first and second battery mount parts (160A, 160B) that are aligned in a longitudinal direction of the power tool. First and second batteries (170A, 170B) are mountable thereon in series along a straight line that extends in the longitudinal direction. The first battery (170A) is mounted on the first battery mount part (160A) by sliding along the straight line towards the second battery mount part (160B). The second battery (170B) is mounted on the second battery mount part (170B) by sliding along the straight line towards the first battery mount part (170A).

20 Claims, 26 Drawing Sheets

Related U.S. Application Data division of application No. 16/558,439, filed on Sep. 3, 2019, now Pat. No. 11,148,272, which is a continuation of application No. 14/810,298, filed on Jul. 27, 2015, now abandoned, which is a continuation-in-part of application No. PCT/JP2014/060835, filed on Apr. 16, 2014, said application No. 17/473,054 is a continuation-in-part of application No. PCT/JP2014/052350, filed on Jan. 31, 2014, and a continuation-in-part of application No. PCT/JP2014/052352, filed on Jan. 31, 2014, and a continuation-in-part of application No. PCT/JP2014/052349, filed on Jan. 31, 2014, and a continuation-in-part of application No. PCT/JP2014/052351, filed on Jan. 31, 2014.

(30) Foreign Application Priority Data

| | | |
|---|---|---|
| Feb. 1, 2013 | (JP) | 2013-018848 |
| Feb. 1, 2013 | (JP) | 2013-018849 |
| Apr. 17, 2013 | (JP) | 2013-086952 |

(58) Field of Classification Search
USPC .................................................. 422/99, 123
See application file for complete search history.

(56) References Cited

U.S. PATENT DOCUMENTS

| | | | | |
|---|---|---|---|---|
| 4,930,583 | A | 6/1990 | Fushiya et al. | |
| 5,028,858 | A | 7/1991 | Schnizler et al. | |
| 5,083,620 | A | 1/1992 | Fushiya et al. | |
| 5,089,738 | A * | 2/1992 | Bergqvist | H01M 50/213 310/47 |
| 5,212,020 | A * | 5/1993 | Inobe | H01M 50/213 429/96 |
| 5,671,815 | A | 9/1997 | Kabatnik et al. | |
| 5,881,823 | A * | 3/1999 | Kabatnik | B25D 17/00 173/217 |
| 5,902,080 | A * | 5/1999 | Kopras | B25F 5/02 30/DIG. 1 |
| 5,962,159 | A * | 10/1999 | Satou | H01M 50/213 429/151 |
| 6,223,835 | B1 | 5/2001 | Habedank et al. | |
| 6,286,611 | B1 | 9/2001 | Bone | |
| 6,357,534 | B1 | 3/2002 | Buetow et al. | |
| 6,376,942 | B1 * | 4/2002 | Burger | H01M 50/247 429/97 |
| 6,412,572 | B2 | 7/2002 | Habedank et al. | |
| 6,595,300 | B2 | 7/2003 | Milbourne | |
| 6,814,156 | B2 | 11/2004 | Dieterle et al. | |
| 7,121,362 | B2 * | 10/2006 | Hsu | B25F 5/02 173/217 |
| 7,186,117 | B2 * | 3/2007 | Chen | H01R 35/04 429/96 |
| 7,581,323 | B2 | 9/2009 | Miklosz et al. | |
| 7,768,750 | B2 | 8/2010 | Uchida | |
| 7,940,025 | B2 * | 5/2011 | Duesselberg | H01M 50/244 429/96 |
| 7,969,116 | B2 * | 6/2011 | Aradachi | H01M 50/213 320/112 |
| 8,123,098 | B2 | 2/2012 | Miyata | |
| 8,349,479 | B2 * | 1/2013 | Okita | H01M 50/209 429/96 |
| 8,579,043 | B2 | 11/2013 | Hirayama et al. | |
| 8,684,106 | B2 * | 4/2014 | Hanawa | H01M 50/247 173/217 |
| 8,733,470 | B2 | 5/2014 | Matthias et al. | |
| 8,813,866 | B2 | 8/2014 | Suzuki | |
| 8,869,912 | B2 | 10/2014 | Roßkamp et al. | |
| 8,984,711 | B2 | 3/2015 | Ota et al. | |
| 9,224,995 | B2 | 12/2015 | Martinsson et al. | |
| 9,233,427 | B2 | 1/2016 | Alberti et al. | |
| 9,321,164 | B2 | 4/2016 | Onoda et al. | |
| 9,561,552 | B2 | 2/2017 | Kocsis et al. | |
| 9,583,746 | B2 | 2/2017 | Ota et al. | |
| 9,630,310 | B2 * | 4/2017 | Ito | H02J 7/0013 |
| 9,669,534 | B2 * | 6/2017 | Okouchi | B25F 5/008 |
| 9,713,880 | B2 * | 7/2017 | Haneda | B27B 17/02 |
| 9,764,399 | B2 * | 9/2017 | Ukai | B23D 49/162 |
| 9,782,885 | B2 | 10/2017 | Yoshikane et al. | |
| 10,155,304 | B2 | 12/2018 | Ito et al. | |
| 10,207,399 | B2 | 2/2019 | Okouchi et al. | |
| 10,513,005 | B2 * | 12/2019 | Kawakami | B24B 23/02 |
| 10,559,789 | B2 | 2/2020 | Ota et al. | |
| 10,562,167 | B2 | 2/2020 | Takeuchi et al. | |
| 10,589,412 | B2 * | 3/2020 | Nagasaka | B25F 5/02 |
| 11,148,272 | B2 | 10/2021 | Yoshikane et al. | |
| 2002/0125022 | A1 | 9/2002 | Dieterle et al. | |
| 2003/0201738 | A1 | 10/2003 | Yamamoto | |
| 2004/0231170 | A1 | 11/2004 | Neitzell et al. | |
| 2006/0022605 | A1 | 2/2006 | Ha et al. | |
| 2006/0113100 | A1 | 6/2006 | Hsu et al. | |
| 2006/0220612 | A1 | 10/2006 | Feldmann et al. | |
| 2006/0222931 | A1 | 10/2006 | Lin | |
| 2006/0260141 | A1 | 11/2006 | Phillips et al. | |
| 2007/0144752 | A1 | 6/2007 | Pozgay et al. | |
| 2008/0315693 | A1 | 12/2008 | Uchida | |
| 2009/0223071 | A1 | 9/2009 | Alberti et al. | |
| 2009/0321101 | A1 | 12/2009 | Furusawa et al. | |
| 2010/0162579 | A1 | 7/2010 | Naughton et al. | |
| 2011/0088922 | A1 | 4/2011 | Hirayama et al. | |
| 2011/0147031 | A1 | 6/2011 | Matthias et al. | |
| 2011/0197389 | A1 | 8/2011 | Ota et al. | |
| 2011/0198103 | A1 | 8/2011 | Suzuki | |
| 2011/0284257 | A1 | 11/2011 | Ogino et al. | |
| 2011/0308831 | A1 | 12/2011 | Martinsson et al. | |
| 2012/0037385 | A1 | 2/2012 | Suzuki et al. | |
| 2012/0045678 | A1 | 2/2012 | Hayashi et al. | |
| 2012/0048588 | A1 | 3/2012 | Iyoda et al. | |
| 2012/0118598 | A1 | 5/2012 | Iio | |
| 2012/0165152 | A1 | 6/2012 | Tokunaga et al. | |
| 2012/0317821 | A1 | 12/2012 | Tsuchiya et al. | |
| 2013/0097878 | A1 | 4/2013 | Naito et al. | |
| 2013/0145631 | A1 | 6/2013 | Ni et al. | |
| 2013/0164589 | A1 | 6/2013 | Ota et al. | |
| 2013/0199810 | A1 | 8/2013 | Wyler | |
| 2013/0213683 | A1 | 8/2013 | Brewster et al. | |
| 2014/0048301 | A1 | 2/2014 | Okouchi et al. | |
| 2014/0082949 | A1 | 3/2014 | Kocsis et al. | |
| 2014/0083729 | A1 | 3/2014 | Naito et al. | |
| 2014/0326477 | A1 | 11/2014 | Thorson et al. | |
| 2014/0352994 | A1 | 12/2014 | Yoshikane et al. | |
| 2015/0104250 | A1 | 4/2015 | Tada et al. | |
| 2015/0188333 | A1 | 7/2015 | Zhang et al. | |
| 2015/0303417 | A1 | 10/2015 | Koeder et al. | |
| 2015/0328763 | A1 | 11/2015 | Ito et al. | |
| 2015/0333301 | A1 | 11/2015 | Ota et al. | |
| 2015/0366133 | A1 | 12/2015 | Nojiri et al. | |
| 2015/0367497 | A1 | 12/2015 | Ito et al. | |
| 2015/0375416 | A1 | 12/2015 | Haneda et al. | |
| 2016/0151905 | A1 | 6/2016 | Tada et al. | |
| 2016/0176064 | A1 | 6/2016 | Okouchi et al. | |
| 2016/0380510 | A1 | 12/2016 | Niwa | |
| 2017/0071134 | A1 | 3/2017 | Li et al. | |
| 2017/0106518 | A1 | 4/2017 | Takeuchi et al. | |
| 2017/0125754 | A1 | 5/2017 | Ota et al. | |
| 2017/0182649 | A1 | 6/2017 | Ito et al. | |
| 2017/0225315 | A1 | 8/2017 | Okouchi et al. | |
| 2017/0334056 | A1 | 11/2017 | Kawakami et al. | |
| 2018/0009098 | A1 | 1/2018 | Nagasaka et al. | |
| 2018/0021866 | A1 | 1/2018 | Ukai et al. | |
| 2018/0099399 | A1 | 4/2018 | Sunabe et al. | |
| 2018/0241281 | A1 | 8/2018 | Doan et al. | |

FOREIGN PATENT DOCUMENTS

| | | | |
|---|---|---|---|
| DE | 102008040061 | A1 | 1/2010 |
| DE | 202011104115 | U1 | 10/2011 |
| DE | 202011110568 | U1 | 10/2014 |
| GB | 2226716 | A | 7/1990 |
| JP | S6248470 | A | 3/1987 |

(56) References Cited

FOREIGN PATENT DOCUMENTS

| | | | |
|---|---|---|---|
| JP | S62224510 | A | 10/1987 |
| JP | 2002260611 | A | 9/2002 |
| JP | 2003220579 | A | 8/2003 |
| JP | 2003317687 | A | 11/2003 |
| JP | 2006281404 | A | 10/2006 |
| JP | 2007044787 | A | 2/2007 |
| JP | 2007105816 | A | 4/2007 |
| JP | 2007290100 | A | 11/2007 |
| JP | 2010005751 | A | 1/2010 |
| JP | 2011088233 | A | 5/2011 |
| JP | 2011161602 | A | 8/2011 |
| JP | 2011161603 | A | 8/2011 |
| JP | 2011526217 | A | 10/2011 |
| JP | 2012240188 | A | 12/2012 |
| JP | 2014037040 | A | 2/2014 |
| JP | 2014079874 | A | 5/2014 |

OTHER PUBLICATIONS

Jan. 21, 2019 Office Action {Third Party Submission) issued in German Patent Application651.3.

Jul. 20, 2017 Office Action issued in German Patent Application No. 11 2014 000 651.3.

Jul. 3, 2018 Office Action issued in German Patent Application No. DE11 2014 000 651.3.

Jun. 10, 2014 Search Report issued in International Patent Application No. PCT/JP2014/060835.

Jun. 10, 2016 Office Action issued in Japanese Patent Application No. 2013-018845.

Jun. 14, 2016 Office Action issued in Japanese Patent Application No. 2013-018848.

Jun. 15, 2016 Office Action issued in Japanese Patent Application No. 2013-018849.

Jun. 8, 2016 Office Action issued in Japanese Patent Application No. 2013-086952.

Mar. 11, 2014 Search Report issued in International Patent Application No. PCT/JP2014/052349.

Mar. 11, 2014 Search Report issued in International Patent Application No. PCT/JP2014/052350.

Mar. 11, 2014 Search Report issued in International Patent Application No. PCT/JP2014/052351.

Mar. 11, 2014 Search Report issued in International Patent Application No. PCT/JP2014/052352.

Nov. 3, 2014 International Preliminary Report on Patentability issued in Japanese Patent Application No. PCT/JP2014/052351.

Nov. 3, 2014 International Preliminary Report on Patentability issued in Patent Application No. PCT/JP2014/052349.

Nov. 3, 2014 International Preliminary Report on Patentability issued in Patent Application No. PCT/JP2014/052350.

Nov. 3, 2014 International Preliminary Report on Patentability issued in Patent Application No. PCT/JP2014/052352.

Oct. 6, 2014 International Preliminary Report on Patentability issued in Japanese Patent Application No. PCT/JP2014/060835.

Office Action mailed Jun. 23, 2021 in counterpart German patent application No. 11 2014 007 320.2 and examined claims 1-9, including English translation thereof.

* cited by examiner

POWER TOOL

CROSS REFERENCE TO RELATED APPLICATIONS

The present application is a divisional application of U.S. patent application Ser. No. 17/473,054 filed on Sep. 13, 2021, now pending, which is a divisional application of U.S. patent application Ser. No. 16/558,439 filed on Sep. 3, 2019, now U.S. Pat. No. 11,148,272, which is a continuation application of U.S. patent application Ser. No. 14/810,298 filed on Jul. 27, 2015, now abandoned, which is a continuation-in-part of International Application Numbers: (1) PCT/JP2014/052349, filed on Jan. 31, 2014, which claims priority to Japanese Patent Application No. 2013-018845 filed on Feb. 1, 2013, (2) PCT/JP2014/052350 filed on Jan. 31, 2014, which claims priority to Japanese Patent Application No. 2013-018846 filed on Feb. 1, 2013, (3) PCT/JP2014/052351, filed on Jan. 31, 2014, which claims priority to Japanese Patent Application No. 2013-018848 filed on Feb. 1, 2013, which claims priority to Japanese Patent Application No. 2013-018845 filed on Feb. 1, 2013, (4) PCT/JP2014/052352 filed on Jan. 31, 2014, which claims priority to Japanese Patent Application No. 2013-018849 filed on Feb. 1, 2013, and (5) PCT/JP2014/060835 filed on Apr. 16, 2014, which claims priority to Japanese Patent Application No. 2013-086952 filed on Apr. 17, 2013.

The contents of these applications are incorporated herein by reference in their entirety.

FIELD OF THE INVENTION

The present invention generally relates to power tools.

BACKGROUND OF THE INVENTION

Japanese non-examined laid-open Patent Publication No. 2010-5751 (US 2009/321101) discloses a cordless hammer drill in which a battery (battery pack) is provided as the power source. In this hammer drill, one battery is mounted on a lower surface of a downward extending part which connects a tool body and a handle.

SUMMARY OF THE INVENTION

The battery utilized in the above-described battery type hammer drill is rechargeable. Therefore, when the amount of remaining battery charge decreases, it becomes necessary to detach the battery from the hammer drill and to charge the battery and then to remount the battery again.

However, because the battery is heavy, there is room for improvement regarding the attaching/detaching operation of the battery and/or the arrangement of battery mount parts for a plurality of batteries.

Accordingly, in one non-limiting aspect of the present disclosure, improved power tools are disclosed.

In another non-limiting aspect of the present disclosure, a power tool which drives a detachably attached tool bit in a driving axis of the tool bit is provided. The power tool comprises a motor which drives the tool bit, a tool body which houses the motor, a handle which is connected to the tool body, and battery mount parts, on which batteries for providing electric current are respectively detachably mounted. The power tool can provide electric current from the batteries mounted to the battery mount part to the motor. The handle extends in a handle-extending direction that crosses a driving axis-extending direction along which the driving axis extends. Each battery mount part comprises a battery engaging part with which the respective battery is engageable and the battery mount part holds the respective battery by engaging the battery with the battery engaging part. To mount the battery, the battery is slid in a cross direction that intersects both of the driving axis-extending direction and the handle-extending direction with respect to the battery engaging part. Further, the handle may be provided on (in) a predetermined plane which includes the driving axis such that the handle extends in the handle-extending direction and intersects the driving axis-extending direction.

According to this aspect of the present disclosure, the power tool comprises a plurality of the battery mount parts and each battery is detachably mounted on the respective battery mount part. Therefore, the degree of design freedom regarding the attachment of each battery is enhanced. Further, each battery is moved in the cross direction that intersects both of the driving axis-extending direction and the handle-extending direction relative to the battery engaging part in order to mount it on the battery mount part. Therefore, if the present design is used in a power tool in which vibration is generated in the driving axis-extending direction, the battery is removed (detached) perpendicular to the (primary) direction of the vibration. As a result, there is a reduced possibility of the battery unintentionally falling off the battery mount part during operation due to the vibration.

According to a further aspect of the power tool of the present disclosure, the battery mount parts may be aligned (side-by-side) in the driving axis-extending direction.

According to this aspect, a compact arrangement of the batteries is possible, thereby simplifying the arrangement of the electric wiring connected to the battery mount parts.

According to a further aspect of the power tool of the present disclosure, the battery engaging parts may be provided such that the batteries are slid from the same side of the tool body with respect to the cross direction to be engaged with the battery engaging parts. In other words, each battery is slid in the cross direction that intersects both of the driving axis-extending direction and the handle extending direction against the tool body (battery mount part) to be mounted on the battery mount part. For example, if the handle-extending direction is defined as the vertical direction, the batteries are moved from either the right side or the left side of the tool body to the opposite side, in order to mount the batteries on the respective battery mount parts.

According to this aspect, the batteries are attached and detached on only one side of the tool bit. Therefore, user ergonomics with regard to the attaching/detaching operation of the batteries are improved. That is, the attaching/detaching operation is easily performed.

According to a further aspect of the power tool of the present disclosure, the battery mount parts may be arranged on the side opposite of the motor with respect to the tool bit in the driving axis-extending direction. In other words, the motor is arranged between the battery mount parts and the tool bit in the front-rear direction of the power tool.

According to this aspect, the batteries mounted on the battery mount parts are disposed relatively remotely from the tool bit. Accordingly, when the tool bit contacts a workpiece during operation of the power tool, since the battery is arranged distantly from the workpiece, the batteries do not interfere with the operation of the tool bit.

According to a further aspect of the power tool of the present disclosure, when the battery is mounted on the battery mount part, a lower surface of the battery may become flush with a lower surface of the tool body.

According to this aspect, in addition to the lower surface of the tool body, the lower surface of the battery becomes a contact (support) surface when the power tool is placed on the ground or a floor. Accordingly, the power tool can be more stably placed on a flat surface.

According to a further aspect of the power tool of the present disclosure, the battery mount parts may be formed such that the length (width) of the battery, when mounted on the battery mount part, in the driving axis-extending direction is shorter than the battery length in the cross direction.

According to this aspect, the battery can be mounted on the battery mount part such that the length of the battery in the driving axis-extending direction is shorter that the length of the battery in the cross direction. Accordingly, with respect to the driving axis-extending direction, the overall length of the power tool can be shortened.

According to a further aspect of the power tool of the present disclosure, each battery mount part may comprise an elastic member which protrudes toward the battery and contacts with the battery when the battery is mounted to the battery mount part. For example, the elastic member may be formed as a rubber element, a spring, etc., and it applies an elastic force onto the battery.

According to this aspect, the elastic member elastically contacts the battery mounted on the battery mount part. Therefore, backlash of the battery due to vibration generated during operation is prevented by the biasing force of the elastic member.

According to a further aspect of the power tool of the present disclosure, the handle may be provided such that at least one end side of the handle in the handle-extending direction is connected to the tool body, and each battery mount part is arranged on the other end side of the handle in the handle-extending direction. The handle may be, e.g., a cantilever-type handle, which has only one of its ends connected to the tool body, or a looped-type handle, which has both of its ends connected to the tool body.

According to a further aspect of the power tool of the present disclosure, the handle may comprise a grip portion configured to be held by a user, and the grip portion is arranged on (along) a driving axis line. Further, all of the battery mount parts may be arranged on one side of the tool body in the handle-extending direction.

According to this aspect, the power tool includes the grip portion of the handle arranged on (along) the driving axis line. Thus, when the user applies a force on (to) the grip portion along the driving axis line in order to perform the operation, the force is linearly transmitted to the tool bit. As a result, the power tool operation can be effectively performed.

According to a further aspect of the power tool of the present disclosure, the handle may comprise a grip portion having one end side connected to the tool body and a reinforcing member connecting the other end side of the grip portion to the tool body. That is, the reinforcing member is provided separately from the grip portion. Thus, the reinforcing member connects a region of the tool body (other than a connecting region between the tool body and the grip portion) to the other end side of the hand grip. In such a design, the battery mount parts are preferably arranged on the reinforcing member.

According to a further aspect of the power tool of the present disclosure, the motor may be arranged such that the rotational axis of a rotary shaft of the motor intersects the driving axis.

According to a further aspect of the power tool of the present disclosure, the motor may be arranged such that the rotational axis of the rotary shaft of the motor is parallel to the driving axis.

According to a further aspect of the power tool of the present disclosure, the battery mount parts may be formed such that the combined center of gravity of the batteries, when mounted on the battery mount parts, is located on (in) a plane that includes the driving axis and a handle central axis, which extends in the handle-extending direction.

According to this aspect, if the front-rear direction of the power tool is defined by the longitudinal direction along which the driving axis extends, the plurality of batteries can be balanced in weight with respect to a lateral direction that crosses (is perpendicular to) the front-rear direction. Accordingly, operability of the power tool is enhanced.

According to another preferable aspect of a power tool of the present disclosure, a power hammering tool which drives a tool bit at least linearly along a driving axis extending in a predetermined longitudinal direction is provided. The power tool may comprise a motor which drives the tool bit, a tool body which houses the motor, a handle which is connected to the tool body, and battery mount parts to which batteries for providing electric current are respectively detachably attached. The handle extends in a handle-extending direction that intersects (is perpendicular to) the longitudinal direction. The battery mount parts are fixed on the tool body so as to be undetachable from the power tool.

According to this aspect of the present disclosure, the power tool may have a plurality of battery mount parts, on which batteries are respectively detachably mounted, and the battery mount parts are fixed on the tool body so as to be undetachable from the power tool. Thus, the batteries may be directly mounted onto the battery mount parts without an adapter, thereby reducing the overall weight of the power tool during operation. Furthermore, it is noted that the term "undetachable" means herein a configuration in which a part or the whole of the battery mount part is not detached easily from the tool body. Namely, it is so-called non-adapter configuration which does not have an adapter that is attached and detached easily. For example, it may include a configuration in which the battery mount part is formed on a region of the tool body or the handle. In other words, the present disclosure permits the battery mount part to be formed by a configuration which does not allow the battery mount part to be attached and detached freely against the power tool, or a configuration in which a free attaching and detaching of the battery mount part is prevented. In this respect, however, it is noted that the present disclosure does not exclude a configuration which is capable of dismantlement (removal) of the battery mount part, i.e. the battery mount part may be dismantled from the power tool. Furthermore, it is noted that the term "fixed" means herein a configuration in which the battery mount part is not movable relative to the tool body. For example, it may preferably include a configuration in which a part or the whole of the battery mount part is integrated with the tool body directly or indirectly. Namely, it preferably includes a configuration in which a part of the whole of the battery mount part is formed integrally with the tool body, and a configuration in which the battery mount part is fixed on the tool body by welding, gluing, rivets, screws and so on.

According to a further aspect of the power tool of the present disclosure, each battery mount part may comprise a battery engaging part with which the battery is engageable and the battery mount part holds the battery by engaging the battery with the battery engaging part. Further, the battery is slid relative to the battery engaging part to be mounted on the battery mount part.

According to this aspect, the battery is attached to the battery mount part by sliding the battery relative to the battery mount part. Accordingly, the attaching operation of the battery is performed easily.

According to a further aspect of the power tool of the present disclosure, the battery mount parts may be arranged to be aligned in a cross direction that intersects (is perpendicular to) both of the longitudinal direction and the handle-extending direction, and each battery is attached by moving in a direction parallel to the longitudinal direction.

According to this aspect, since the battery mount parts are arranged side by side, a compact arrangement of the plurality of batteries is achieved. As a result, the arrangement of electric wiring with respect to the battery mount parts is simplified.

Thus, in some aspects of the present disclosure, improved power tools with respect to an attaching and detaching technique of the batteries are provided.

Other objects, features and advantages of the present disclosure will be readily understood after reading the following detailed description together with the accompanying drawings and the claims.

DETAILED DESCRIPTION OF PREFERRED EMBODIMENTS

Each of the additional features and method steps disclosed above and below may be utilized separately or in conjunction with other features and method steps to provide and manufacture improved power tools and method for using such power tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment

Figure 1:
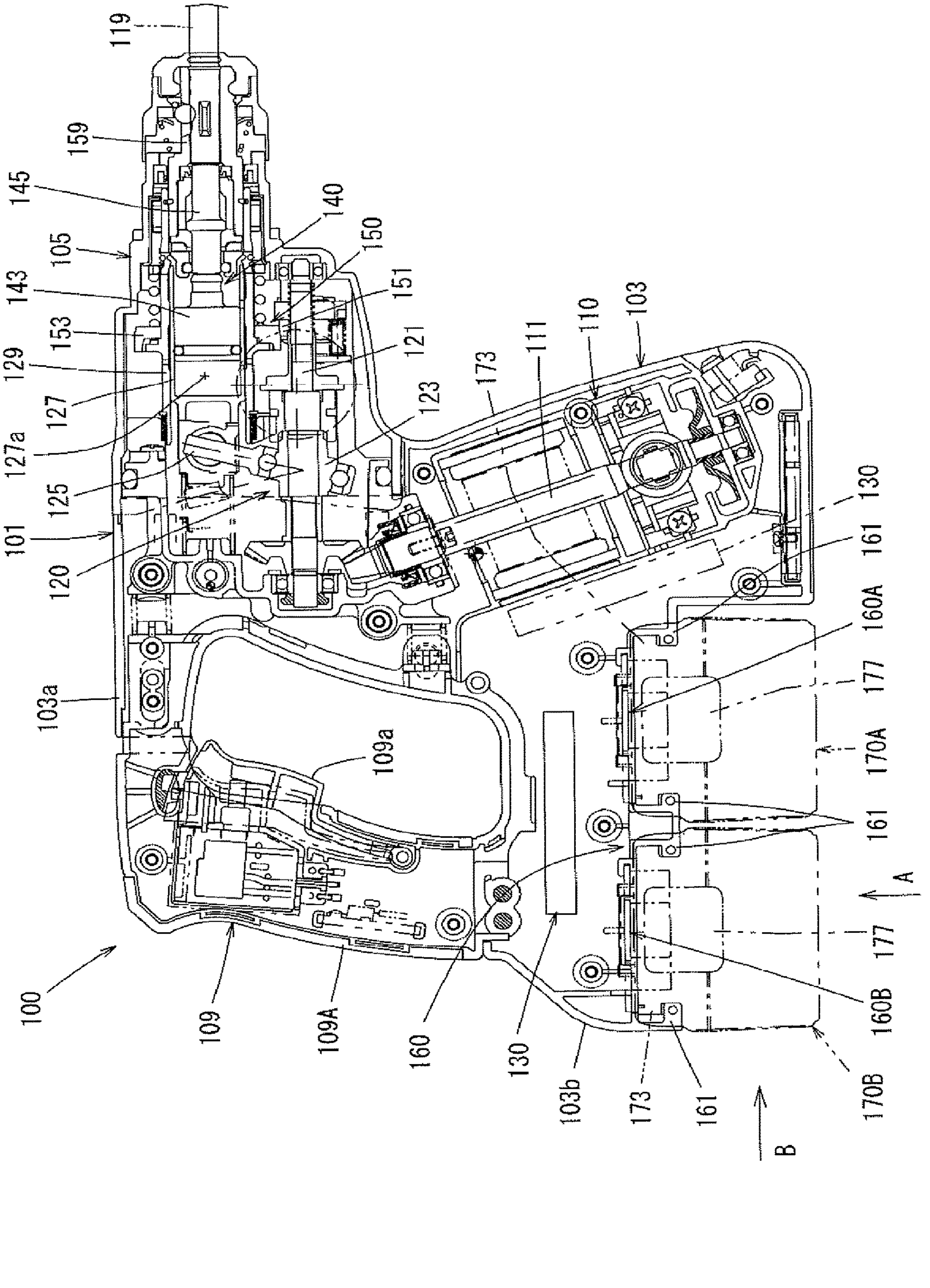
FIG. 1 shows a cross sectional view of a hammer drill of a first embodiment according to the present disclosure.

A first embodiment of the present disclosure is explained below with reference to FIG. 1 to FIG. 9. The first embodiment is explained by using a battery type (cordless) hammer drill as a one example of a power tool according to the present teachings. As shown in FIG. 1, an electric hammer drill 100 having a hammer bit 119 attached thereto is a power tool configured to perform a drilling operation and/or a chipping operation on a workpiece by causing the attached hammer bit 119 to undergo a hammering movement in its longitudinal direction and/or a rotational movement around its longitudinal direction. The hammer bit 119 is an example of a feature which corresponds to "a tool bit" in the present disclosure.

The hammer drill 100, in an overall view, is provided with a main body 101 which forms at least a portion of an outline of the hammer drill 100. At a front region of the main body 101, the hammer bit 119 is detachably attached thereto via a cylindrical tool holder 159. The hammer bit 119 is inserted into a bit insertion hole of the tool holder 159 and held such that it is allowed to reciprocate in its longitudinal direction with respect to the tool holder 159 and prevented from rotating in its circumferential direction with respect to the tool holder 159.

The main body 101 is mainly provided with a motor housing 103 which houses an electric motor 110, and a gear housing 105 which houses a motion converting mechanism 120, a hammering mechanism 140 and a power transmitting mechanism 150. A hand grip 109 which is held by a user is connected to the main body 101 at a side opposite to the hammer bit 119 in the longitudinal direction of the hammer bit 119. The main body 101 is an example of a feature which corresponds to "a tool body" and the hand grip 109 is an example of a feature which corresponds to "a handle" in the present disclosure.

Further, in this embodiment, for the sake of convenience of explanation, with respect to the longitudinal direction of the hammer bit 119 or a longitudinal direction of the main body 101, the hammer bit 119 side is referred to as a front side of the hammer drill 100 and the hand grip 109 side is referred to as a rear side of the hammer drill 100. Furthermore, an upper side in FIG. 1 is referred to as an upper side of the hammer drill 100 and a lower side in FIG. 1 is referred to as a lower side of the hammer drill 100.

In the main body 101, the gear housing 105 is arranged in the front and the motor housing 103 is arranged in the rear in the longitudinal direction of the hammer bit 119. Further, the hand grip 109 is arranged rearward of the motor housing 103. The motor housing 103 is extended downwardly lower than a lower surface of the gear housing 105 and the electric motor 110 is arranged in this extended region. The electric motor 110 is arranged such that a rotational axis of the electric motor 110 is extended so as to incline with respect to a vertical direction and to cross a hammering axis extending in the longitudinal direction of the hammer bit 119. The electric motor 110 is an example of a feature which corresponds to "a motor" and the hammering axis is an example of a feature which corresponds to "a driving axis" in the present disclosure.

Namely, the hammer drill 100 according to the first embodiment is constructed such that the hammering axis of the hammer bit 119 is perpendicular to the rotational axis of the electric motor 110 and hereinafter the hammer drill having such construction is called as a first form of the hammer drill for the sake of convenience. Further, each of the motor housing 103, the gear housing 105 and the hand grip 109, which form the main body 101, is provided by connecting left and right (split) housing members to each other along the longitudinal direction of the hammer bit 119.

The rotational output of the electric motor 110 is converted into a linear motion by the motion converting mechanism 120 and then transmitted to the hammering mechanism 140, and causes an impact force to be applied in the longitudinal direction of the hammer bit 119 (lateral direction in FIG. 1) via the hammering mechanism 140. Further, the rotational output of the electric motor 110 is decelerated by the power transmitting mechanism 150 and then transmitted to the hammer bit 119, thereby rotating the hammer bit 119 in its circumference direction. The electric motor 110 is energized and driven when a trigger 109*a* arranged on the hand grip 109 is pulled.

The motion converting mechanism 120 is arranged above a motor shaft 111 of the electric motor 110 and the motion converting mechanism 120 converts the rotational output of the motor shaft 111 into the linear motion in a front-rear direction of the hammer drill 100. The motion converting mechanism 120 is provided with an intermediate shaft 121 which is rotationally driven by the motor shaft 111, a rotation member 123 which is mounted to the intermediate shaft 121, a swing member 125 which is swung in the front-rear direction of the hammer drill 100 by rotation of the intermediate shaft 121 (rotation member 123), a cylindrical piston 127 in the form of a driving member which is reciprocated in the front-rear direction of the hammer drill 100 by the swinging motion of the swing member 125 and a cylinder 129 which houses the piston 127. The motor shaft 111 is arranged so as to be inclined (oblique) with respect to the intermediate shaft 121. The cylinder 129 is formed integrally with the tool holder 159 as a rear part of the tool holder 159.

The hammering mechanism 140 is arranged above the motion converting mechanism 120 and rearward of the tool holder 159, and the hammering mechanism 140 transmits a linear output in the front-rear direction of the hammer drill 100, which is converted from the rotational output of the electric motor 110 by the motion converting mechanism 120, to the hammer bit 119 as a hammering force. That is, the hammering mechanism 140 is provided with a striker 143 in the form of an impact element which is slidably disposed within the cylindrical piston 127, and an impact bolt 145 which is arranged frontward of the striker 143 and is struck by the striker 143. Further, an inner space rearward of the striker 143 in the piston 127 defines an air chamber 127*a* which transmits the slide motion of the piston 127 to the striker 143 caused by air pressure fluctuations.

The power transmitting mechanism 150 is arranged frontward of the motion converting mechanism 120 and the power transmitting mechanism 150 transmits the rotational output of the electric motor 110 transmitted from the intermediate shaft 121 of the motion converting mechanism 120 to the tool holder 159. That is, the power transmitting mechanism 150 is provided with a gear deceleration mechanism which comprises a plurality of gears including a first gear 151 which is rotated integrally with the intermediate shaft 121, a second gear 153 which is engaged and meshed with the first gear 151 and is mounted onto the tool holder 159 (cylinder 129) and so on.

The hand grip 109 is provided with a grip portion 109A which extends in a vertical direction perpendicular to the longitudinal direction of the hammer bit 119 (hammering axis-extending direction). The hammering axis-extending direction, which is also the longitudinal direction of the hammer bit 119, is an example of a feature which corresponds to "a driving axis-extending direction" or simply "driving axis" in the present disclosure. Further, the vertical direction is an example of a feature which corresponds to "a handle-extending direction" in the present disclosure. The grip portion 109A is arranged with predetermined spacing in the longitudinal direction of the hammer bit 119 with respect to an upper part of the motor housing 103. An upper part of the grip portion 109A is connected to an upper connection part 103*a* which extends rearward in substantially horizontal manner from a rear-upper end region of the motor housing 103, and a lower part of the grip portion 109A is connected to a lower connection part 103*b* which extends rearward in substantially horizontal manner from an intermediate region in the vertical direction of the motor housing 103. Further, in the first embodiment, as shown in FIG. 1, the upper connection part 103*a* and the lower connection part 103*b* extend from and are formed integrally with the motor housing 103; however, these parts may extend from and may be formed integrally with the grip portion 109A.

The lower connection part 103*b* of the motor housing 103 extends rearward from a substantially intermediate region in the vertical direction of the motor housing 103 and has a mount part 160 to which battery packs are mounted at (on) its lower surface part. The mount part 160 comprises two battery mount parts 160A, 160B.

The two battery mount parts 160A, 160B are aligned next to each other (side-by-side) in the longitudinal direction of the hammer bit 119. These two battery mount parts 160A, 160B are fixed on the lower connection part 103*b* in an undetachable manner from the hammer drill 100.

Further, each battery pack 170A, 170B for providing driving electric current to the electric motor 110 is individually detachably attached on the battery mount part 160A, 160B, respectively. The two battery mount parts 160A, 160B are an example of a feature which corresponds to "a plurality of battery mounting parts" in the present disclosure, and the battery packs 170A, 170B are examples of a feature which corresponds to "a battery" in the present disclosure. In FIG. 1 to FIG. 4, the battery packs 170A, 170B are illustrated by a chain double-dashed line.

Furthermore, an inner space is formed within the lower connection part 103*b*; a controller 130 for controlling the electric motor 110 is provided in the inner space. That is, the controller 130 is, as shown in FIG. 1, arranged between the battery packs 170A, 170B and the hand grip 109. In other words, the controller 130 is horizontally arranged above the battery packs 170A, 170B. Further, as shown by the chain double-dashed line in FIG. 1, the controller 130 may be arranged rearward of the electric motor 110 between the battery packs 170A, 170B and the electric motor 110.

FIG. 6 to FIG. 9 show details of the battery pack 170A, 170B (FIG. 6 to FIG. 9 show one battery pack). The battery pack 170A, 170B is provided with a substantially rectangular parallelepiped battery case 171 and a plurality of battery cells (not shown) which are housed in the battery case 171. The battery pack 170A, 170B is detachably mounted to each of the battery mount parts 160A, 160B by horizontally sliding along a lower surface of the battery mount part 160A, 160B in a lateral direction which crosses (is perpendicular to) both of the longitudinal direction of the hammer bit 119 and the handle-extending direction of the hand grip 109. Further, each of two battery packs 170A, 170B has the same construction (configuration) and is attachable to both of two battery mount parts 160A, 160B.

In order to slide the battery pack 170A, 170B against the battery mount part 160A, 160B, each of pair of mount guides 173 which extends in a longitudinal direction of the battery pack 170A, 170B is provided on each side surface of an upper side of the battery case 171. Further, a hook 175 for locking and a press button 177 for unlocking are provided at a center part of the upper side. The hook 175 for locking is provided at a rear side part with respect to an attaching direction of the battery pack 170A, 170B (sliding direction while attaching) and is biased by a spring (not shown) such that it protrudes from an upper surface of the battery case 171. The press button 177 for unlocking is provided at rear side part with respect to the attaching direction of the battery case 171 (a sliding direction while attaching). Further, the press button 177 is mechanically linked with the hook 175 such that when the press button 177 is pressed, the hook 175 is moved in a direction such that the hook 175 is pulled down from the upper surface of the battery case 171.

Figure 2:
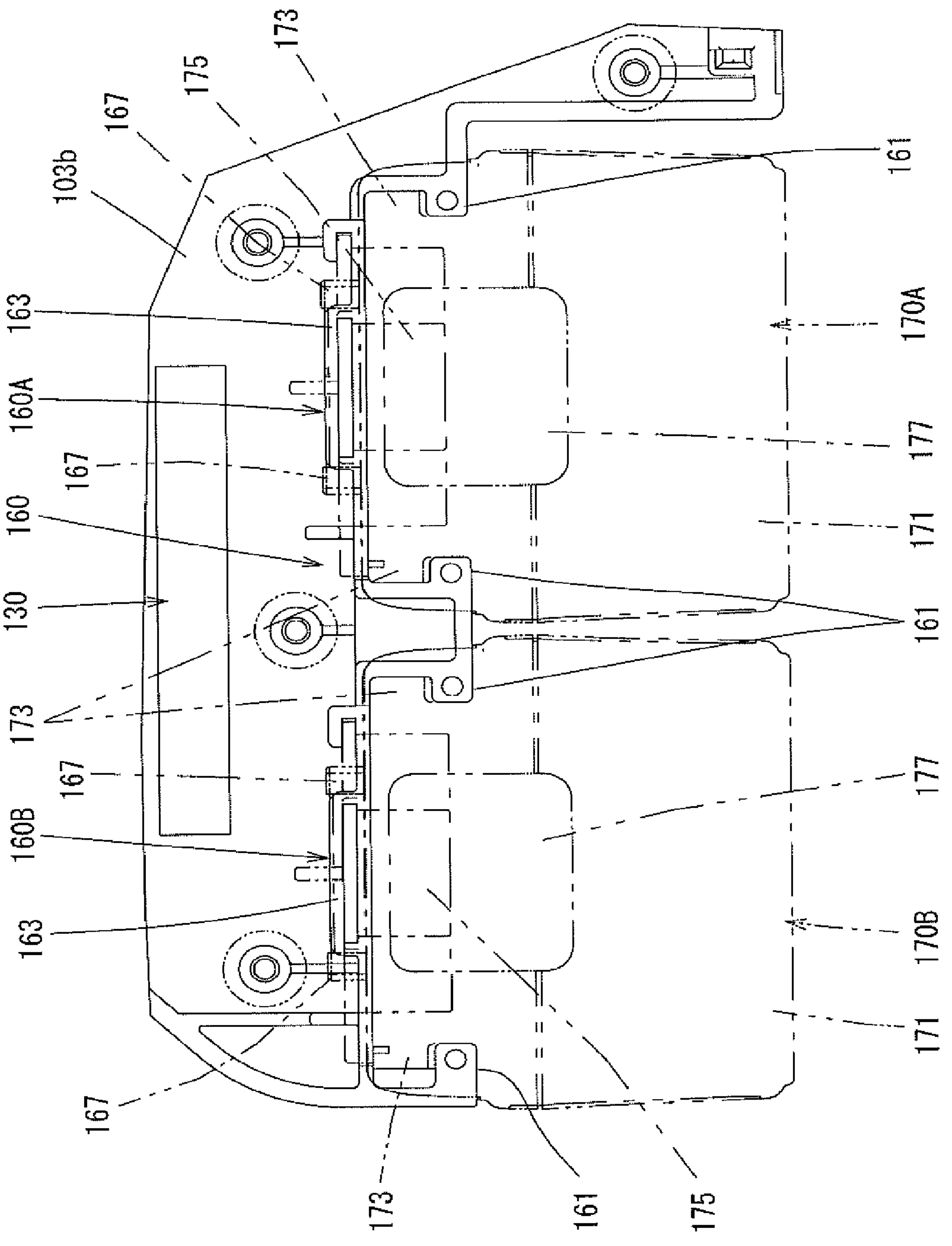
FIG. 2 shows an enlarged view of battery packs attached to battery mount parts.

On the other hand, as shown in FIG. 1 and FIG. 2, the battery mount parts 160A, 160B each include a pair of (front and rear) guide rails 161 which extend in a lateral direction crossing (perpendicular to) the longitudinal direction of the hammer bit 119 (hammering axis), and are configured to mount the battery pack 170A, 170B on the lower side of the hammer drill 100.

The guide rails 161 are formed integrally with the lower connection part 103*b*. The guide rails 161 form substantially U-shaped section in the lateral direction such that one end in the extension direction of the guide rails 161 is opened to serve as an insertion opening for the mount guides 173. Therefore, the mount guides 173 of the battery pack 170A, 170B can be slid against the guide rails 161 in a direction that crosses (is perpendicular to) both of the longitudinal direction of the hammer bit 119 and the handle-extending direction of the hand grip 109 to be inserted into the respective battery mount part 160A, 160B.

That is, the guide rails 161 function as a guide means while the battery pack 170A, 170B is being mounted on the battery mount part 160A, 160B and also function as a detachment preventing mean to prevent the battery pack 170A, 170B from falling off the battery mount part 160A, 160B during operation. The guide rails 161 are an example of a feature which corresponds to "a battery engaging part" in the present disclosure.

Figure 4:
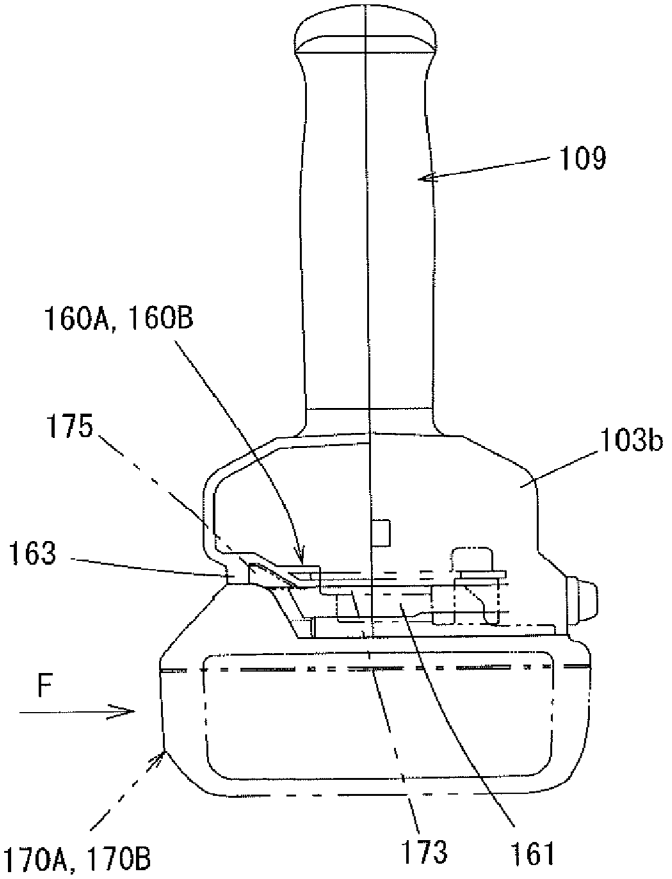
FIG. 4 shows a view of the hammer drill in the direction of arrow B in FIG. 1.

Further, as shown in FIG. 4, each battery mount part 160A, 160B comprises a recessed engagement part 163 with which the hook 175 of the battery pack 170A, 170B can engage. The engagement part 163 is arranged between the front and rear guide rails 161 on the battery inserted side. Accordingly, when the battery pack 170A, 170B is mounted on the battery mount part 160A, 160B, the engagement part 163 is engaged with the hook 173. Therefore, the battery pack 170A, 170B is fixed on the battery mount part 160A, 160B such that movement in a detaching direction (a direction opposite to the sliding direction while attaching) or in fall off direction of the battery pack 170A, 170B is prevented. Further, when mounting the battery pack 170A, 170B on the battery mount part 160A, 160B, a tapered part of the hook 173 is pressed by the engagement part 163 and once moved downward, and thereafter the hook 173 engages with the engagement part 163 by returning to its initial position.

When the battery pack 170A, 170B is mounted on the battery mount part 160A, 160B, it is held such that an outer surface (except for an upper surface that serves as a mounting surface mounted to the battery mount part 160A, 160B) is exposed. Further, a lower surface of the battery pack 170A, 170B becomes flush with a lower surface of the motor housing 103. With such a construction, the lower surfaces of the battery pack 170A, 170B and the motor housing 103 are formed as a placement surface and thereby the hammer drill 100 can be stably placed on the ground or a floor.

As described above, the battery pack 170A, 170B is arranged rearward of the electric motor 110 and below the hand grip 109 such that the longitudinal direction of the battery pack 170A, 170B is parallel to a crossing direction which crosses (is perpendicular to) both of the longitudinal direction of the hammer bit 119 and the handle-extending direction. Two battery packs 170A, 170B are arranged side-by-side in the front-rear direction (the longitudinal direction of the hammer bit 119). That is, the battery packs 170A, 170B are mounted on the battery mount parts 160A, 160B such that their lengths (widths) in the longitudinal direction of the hammer bit 119 are shorter than their lengths in the direction perpendicular to the longitudinal direction of the hammer bit 119.

Further, in the first embodiment, when viewed from the rear of the hammer drill 100, the attaching direction of the battery packs 170A, 170B is defined by a moving (sliding) direction from the left side to the right side of the hammer drill 100 (the direction shown by arrow F in FIG. 3 and FIG. 4), while the detaching direction of the battery packs 170A, 170B is defined as the opposite moving direction. That is, in the first embodiment, the attaching/detaching direction of the battery pack 170A and the attaching/detaching direction of the battery pack 170B are the same direction. However, as a modified example, the attaching/detaching directions of the battery packs 170A, 170B may be defined as different directions to each other. Namely, when viewed from the rear of the hammer drill 100, one battery pack 170A may be attached from the right side of the hammer drill 100 and another battery pack 170B may be attached from the left side of the hammer drill 100.

Figure 5:
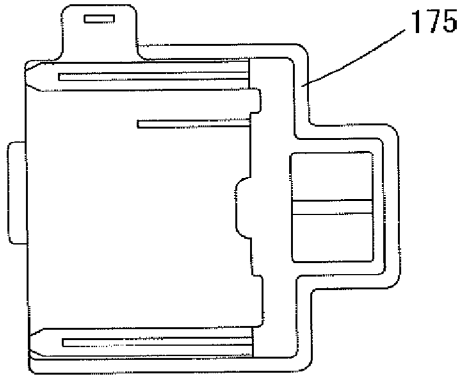
FIG. 5 shows a terminal of the battery mount part.
Figure 6:
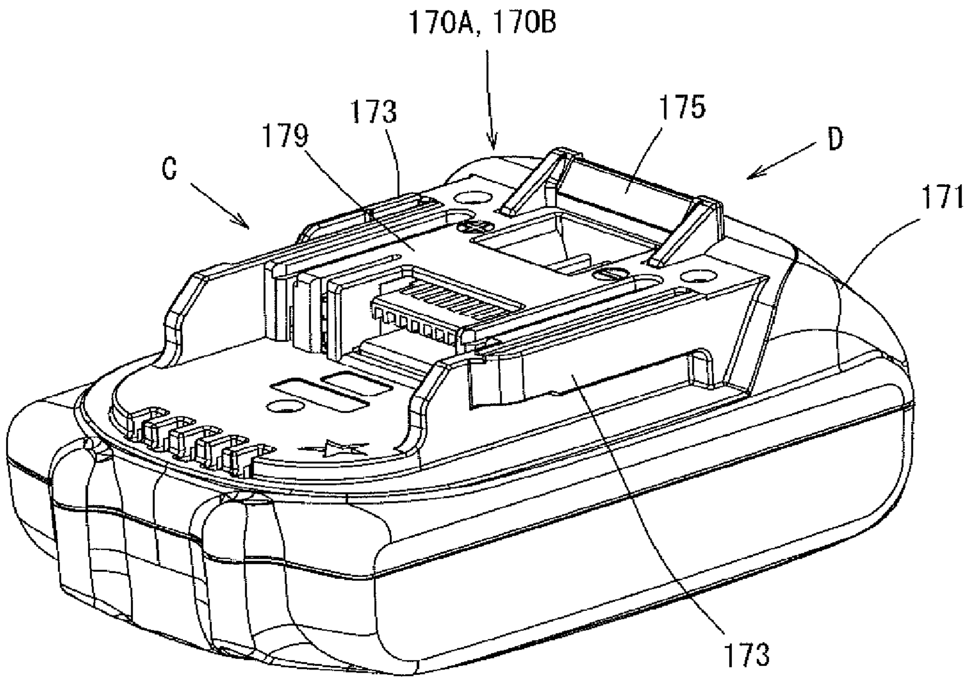
FIG. 6 shows a perspective view of a battery pack.
Figure 7:
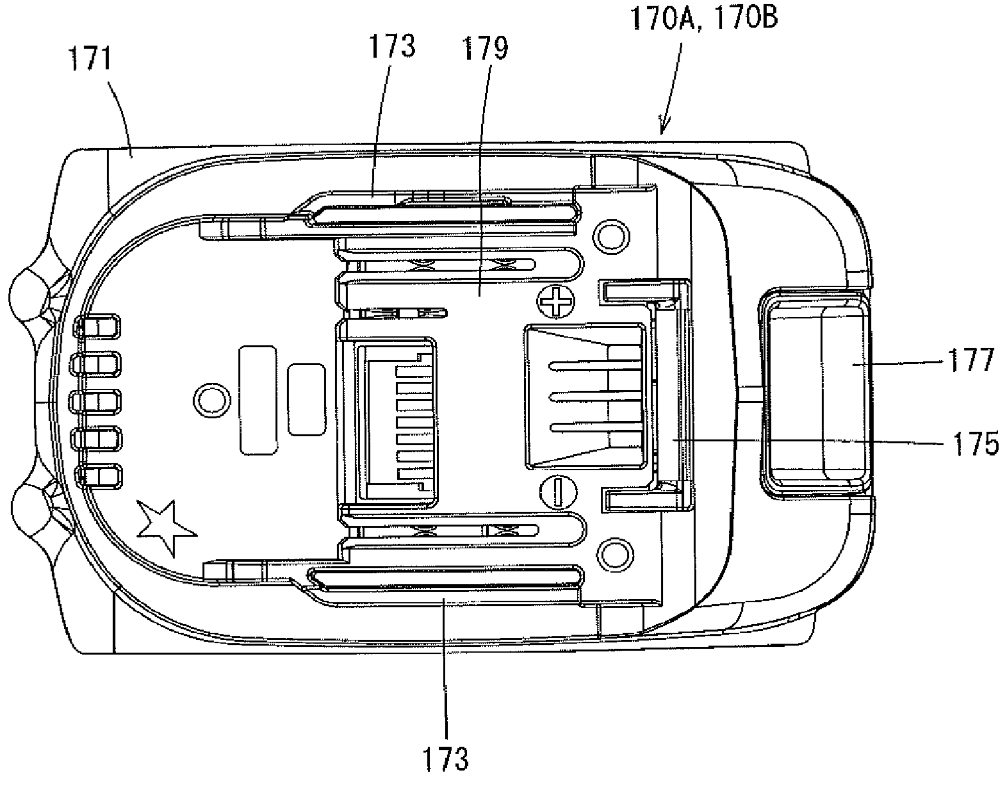
FIG. 7 shows a top view of the battery pack.
Figure 8:
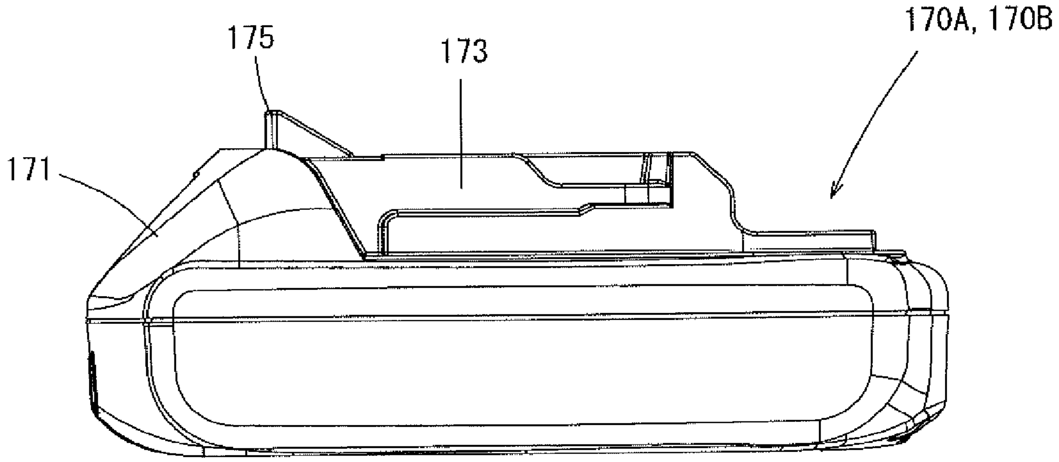
FIG. 8 shows a view of the battery pack in the direction of arrow C in FIG. 6.
Figure 9:
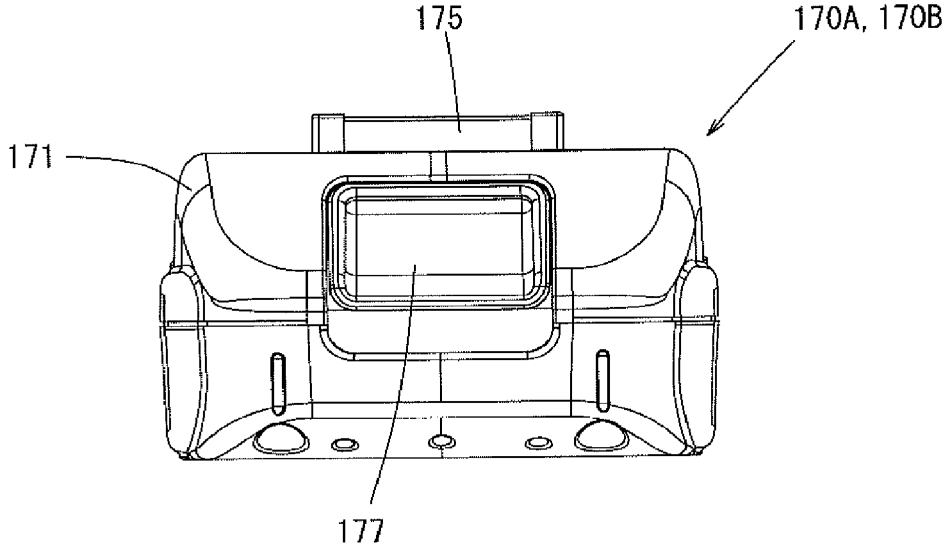
FIG. 9 shows a view of the battery pack in the direction of arrow D in FIG. 6.

Further, each battery mount part 160A, 160B has a terminal 165 (refer to FIG. 5). The terminal 165 is arranged between the pair of (front and rear) guide rails 161 in each battery mount part 160A, 160B and fixed on the lower surface of the lower connection part 103*b*.

Further, when the battery packs 170A, 170B are mounted on the battery mount parts 160A, 160B, the terminals 179 (refer to FIG. 6 and FIG. 7) of the battery packs 170A, 170B are respectively electrically connected to the terminals 165 formed on the lower surface of each battery mount part 160A, 160B (refer to FIG. 5), and thereby it makes possible to conduct electric current to the electric motor 110 and the controller 130.

Figure 3:
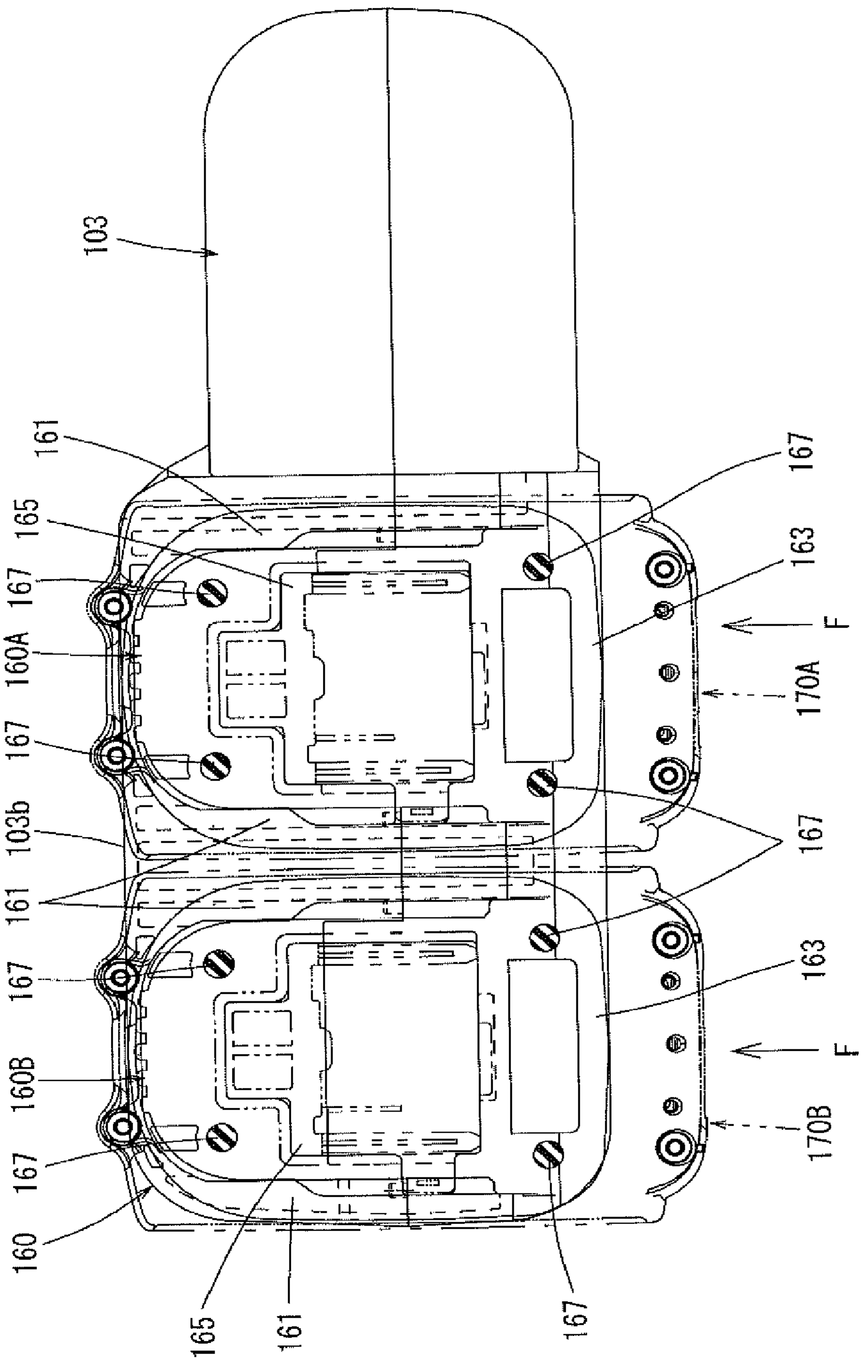
FIG. 3 shows a view of the hammer drill in the direction of arrow A in FIG. 1.

Further, as shown in FIG. 3, four cylindrical rubber pins 167 are provided on the lower surface of each battery mount part 160A, 160B, such that they are respectively arranged at the four corners of a virtual rectangle. These four rubber pins 167 protrude downward at a predetermined length and provide a downward elastic bias at the four points against the upper surface of the battery pack 170A, 170B mounted on the battery mount part 160A, 160B. With such a construction, rattling of the battery pack 170A, 170B due to vibration is suppressed. The rubber pins 167 are an example of a feature which corresponds to "an elastic member" in the present disclosure. Furthermore, the rubber pins 167 may be formed in a shape other than the cylindrical shape, and alternatively a spring element, such as a flat spring, may be utilized instead of the rubber pin 167.

As described above, according to the first embodiment, the battery mount parts 160A, 160B are provided at two locations (front and rear) on the lower connection part 103*b* of the motor housing 103, and the battery packs 170A, 170B are respectively detachably mounted on the battery mount parts 160A, 160B. Therefore, for example, in a hammer drill 100 having a rated voltage of 36V, two 18V battery packs 170A, 170B are mounted and electrically connected in series. It is noted that 18V battery packs are lighter than 36V battery packs. Therefore, a user can replace, attach, detach, etc. the 18V battery packs 170A, 170B more easily than a 36V battery pack, thereby improving the ergonomics of the hammer drill 100. Moreover, in a hammer drill 100 having a rated voltage of 18V, two 18V battery packs 170A, 170B may be mounted and electrically connected in parallel. In such a case, a longer-term driving of the hammer drill 100 becomes possible. Further, in a hammer drill 100 having a switchable rated voltage of 36V/18V, the connection mode of the battery packs 170A, 170B may be switched between an in series mode and an in parallel mode. In such a case, a voltage switch may preferably be provided to enable a user to switch the connection mode.

Further, according to the first embodiment, two battery mount parts 160A, 160B are provided and fixed on the lower connection part 103*b* of the motor housing 103, and the battery packs 170A, 170B are mounted on these battery mount parts 160A, 160B. That is, two battery packs 170A, 170B are mounted directly on the battery mount parts 16A, 160B without an adapter. Accordingly, even though a plurality of battery packs are mounted, an adapter is not required, which may be advantageous as compared to a construction in which a plurality of the battery packs are mounted to a single battery mount part via an adapter. By eliminating the need for an adapter, the hammer drill 100 can be made more lightweight.

Furthermore, each battery pack 170A, 170B is generally formed as a substantially rectangular parallelepiped shape. According to the first embodiment, the 18V battery packs 170A, 170B are aligned in the front-rear direction and arranged on the lower connection part 103*b* of the motor housing 103 such that the longitudinal direction of the battery packs is perpendicular to the longitudinal direction of the hammer bit 119. That is, when the battery packs 170A, 170B are mounted on the battery mount parts 160A, 160B, each battery pack 170A, 170B is arranged such that its length (width) in the longitudinal direction of the hammer bit 119 is shorter than its length in a direction crossing (perpendicular to) the longitudinal direction. With such a construction, the length of the space for receiving the battery pack 170A, 170B in the longitudinal direction of the hammer bit 119 becomes shorter, as compared to a construction in which the longitudinal direction of the battery packs 170A, 170B is parallel to the longitudinal direction of the hammer bit 119. Accordingly, a more compact-shaped the hammer drill 100 can be provided, in which its length in the front-rear direction is shortened.

Further, according to the first embodiment, the battery pack 170A, 170B is mounted on the battery mount part 160A, 160B by inserting into the battery mount part 160A, 160B from the side of the hammer drill 100. Therefore, in each battery pack 170A, 170B, the detaching direction of the battery pack 170A, 170B crosses (is perpendicular to) the hammering axis of the hammer bit 119 or a direction of vibration generated by the hammering movement of the hammer bit 119. Accordingly, the detaching direction of the battery pack 170A, 170B does not align with the vibration direction of the hammer drill 100, and the likelihood of the battery pack 170A, 170B falling out due to the vibration of the hammer drill 100 is reduced.

Further, according to the first embodiment, each battery pack 170A, 170B is mounted on the battery mount part 160A, 160B by sliding the mount guides 173 of the battery pack 170A, 170B along the guide rails 161 of the battery mount part 160A, 160B. Accordingly, the battery pack 170A, 170B is easily mounted.

Further, according to the first embodiment, the battery pack 170A, 170B is arranged rearward of the motor housing 103 and below the hand grip 109. In the first form of the hammer drill 100, due to structural characteristics in which a region of the motor housing 130 which houses the electric motor 110 is extended downward, a free space is provided rearward of the downward extending region which is below the hand grip 109. Therefore, since the battery packs 170A, 170B effectively utilize this free space, the battery packs 170A, 170B are rationally arranged. Further, such a position of the battery packs 170A, 170B is remote from the operation point of the hammer bit 119, and thereby the battery packs 170A, 170B do not interfere with the power tool operation.

Further, according to the first embodiment, the battery packs 170A, 170B are arranged rearward of the motor housing 103 and below the hand grip 109, and the lower surface of the battery packs 170A, 170B is flush with the lower surface of the motor housing 103. Therefore, when the hammer drill 100 is placed on the ground or the floor, the hammer drill 100 can be stably placed. Further, in the first embodiment, although the hammering axis of the hammer bit 119 and the rotational axis of the electric motor 110 are inclined relative to each other, the arrangement is not limited to this. For example, the electric motor 110 may be arranged such that the hammering axis of the hammer bit 119 and the rotational axis of the electric motor 110 perpendicularly intersect each other.

Further, according to the first embodiment, two battery mount parts 160A, 160B are arranged side by side. Therefore, electric wiring, which is connected to the respective terminals 165 of the battery mount parts 160A, 160B to which the batteries 170A, 170B are electrically connected, can be arranged in simplified manner.

Second Embodiment

Figure 10:
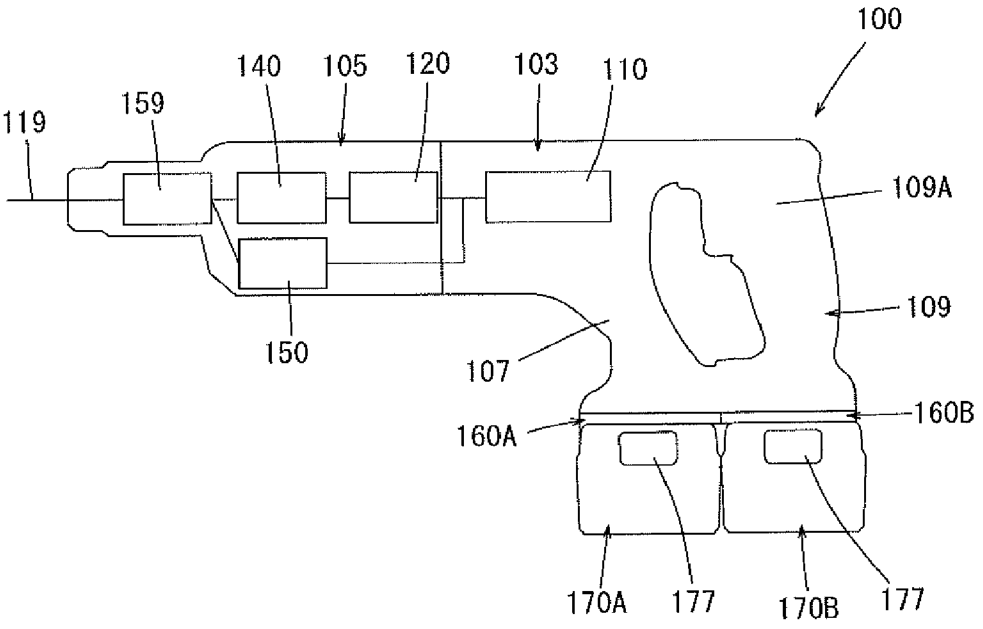
FIG. 10 shows a schematic view of a hammer drill and an arrangement of the battery packs with respect to the hammer drill of a second embodiment according to the present disclosure.

Next, a second embodiment is explained with reference to FIG. 10. As shown in FIG. 10, in the second embodiment, the electric motor 110 is arranged such that the rotational axis of the electric motor 110 is parallel to the hammering axis of the hammer bit 119. In addition, the grip portion 109A of the hand grip 109 is arranged on the hammering axis line. The hammer drill 100 according to the second embodiment will be hereinafter called a second form of the hammer drill, for the sake of convenience. The hand grip 109 extends from a rear-upper end region of the motor housing 103 downwardly and crosses the longitudinal direction (axis) of the hammer bit 119. A tip end of the grip portion 109A and a rear-lower end region of the motor housing 103 are connected by a support member 107 for reinforcing the hand grip, which extends in an inclined relative to the up-and-down direction (vertical direction). That is, the hand grip 109 comprises the grip portion 109A and the support member 107. The support member 107 is an example of a feature which corresponds to "a reinforcing member" in the present disclosure. Rotation of a rotary shaft of the electric motor 110 is converted into a linear motion by the motion converting mechanism 120 and then is transmitted as an impact force to the hammer bit 119 held by the tool holder 159 via the hammering mechanism 140. Furthermore, the rotation of the rotary shaft of the electric motor 110 is also transmitted as a rotational motion to the hammer bit 119 held by the tool holder 159 via the power transmitting mechanism 150.

In the second form of the hammer drill 100 described above, two battery mount parts 160A, 160B are provided and aligned in the longitudinal direction of the hammer bit 119 on the lower surface of the tip end of the grip portion 109A and the support member 107. Further, the battery packs 170A, 170B are respectively detachably mounted to the battery mount parts 160A, 160B. The battery packs 170A, 170B are mounted on the battery mount parts 160A, 160B by inserting (sliding) into the battery mount parts 160A, 160B in a direction crossing (perpendicular to) the longitudinal direction of the hammer bit 119 from the side of the hammer drill 100. Thus, according to the second embodiment, in the second form of the hammer drill 100, advantages similar to those described above in the first embodiment can be obtained.

Third Embodiment

Figure 11:
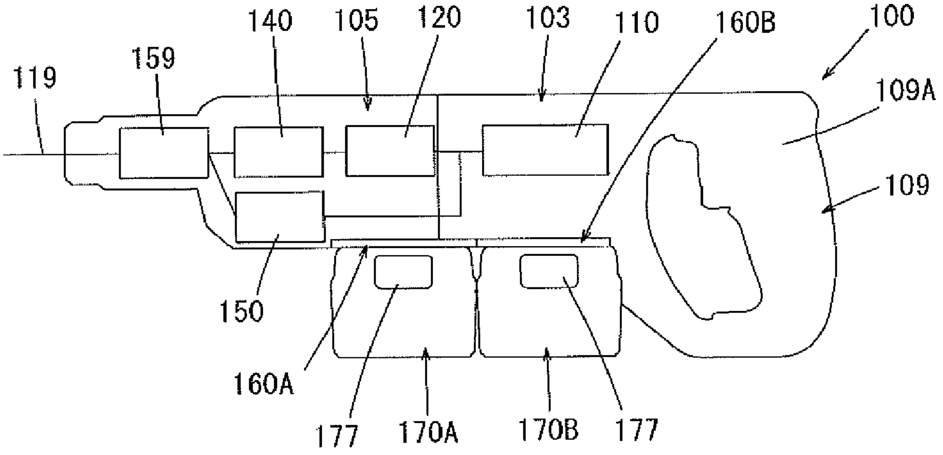
FIG. 11 shows a schematic view of a hammer drill and an arrangement of the battery packs with respect to the hammer drill of a third embodiment according to the present disclosure.

Next, a third embodiment is explained with reference to FIG. 11. According to the third embodiment, in the second form of the hammer drill 100, two battery mount parts 160A, 160B are provided and aligned in the longitudinal direction of the hammer bit 119 so as to be astride the lower surfaces of both of the motor housing 103 and the gear housing 105. Further, the battery packs 170A, 170B are respectively detachably mounted on the battery mount parts 160A, 160B. The battery packs 170A, 170B are mounted on the battery mount part 160A, 160B by inserting (sliding) into the battery mount parts 160A, 160B in a direction crossing (perpendicular to) the longitudinal direction of the hammer bit 119 from the side of the hammer drill 100. Thus, according to the third embodiment, in the second form of the hammer drill 100, advantages similar to those described above in the first embodiment can be obtained.

Fourth Embodiment

Figure 12:
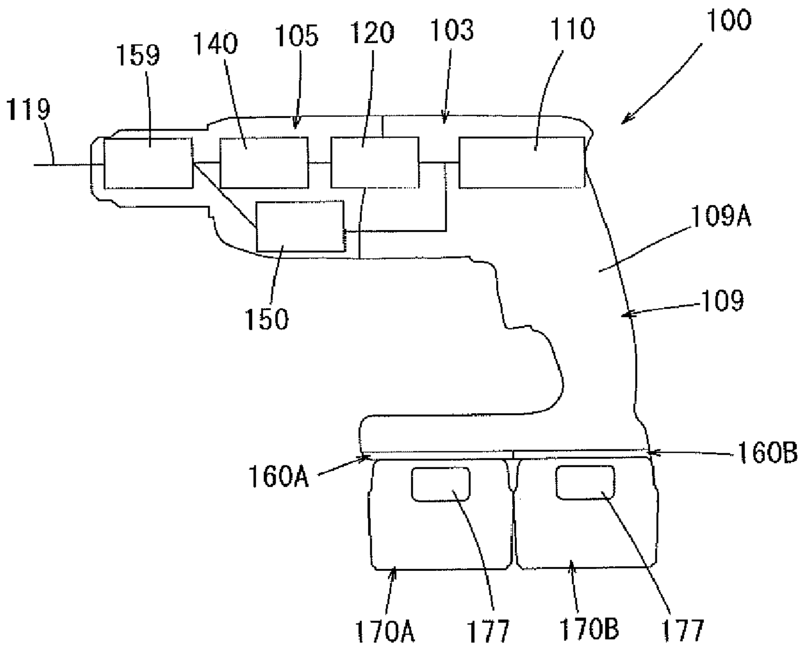
FIG. 12 shows a schematic view of a hammer drill and an arrangement of the battery packs with respect to the hammer drill of a fourth embodiment according to the present disclosure.

Next, a fourth embodiment is explained with reference to FIG. 12. As shown in FIG. 12, in the fourth embodiment, the grip portion 109A of the hand grip 109 is provided so as to extend from a lower region of the rear end side part of the motor housing 103 downwardly and crosses the longitudinal direction of the hammer bit 119. The hammer drill 100 according to the fourth embodiment will be hereinafter called a third form of the hammer drill, for the sake of convenience.

In the third form of the hammer drill 100 described above, two battery mount parts 160A, 160B are provided and aligned in the longitudinal direction of the hammer bit 119 on the lower surface of the hand grip 109 which is formed as the tip end (free end) of the hand grip 109. Further, the battery packs 170A, 170B are respectively detachably mounted on the battery mount parts 160A, 160B. The battery packs 170A, 170B are mounted on the battery mount part 160A, 160B by inserting (sliding) into the battery mount parts 160A, 160B in a direction crossing (perpendicular to) the longitudinal direction of the hammer bit 119 from the side of the hammer drill 100. Thus, according to the fourth embodiment, in the third form of the hammer drill 100, advantages similar to those described above in the first embodiment can be obtained.

Fifth Embodiment

Figure 13:
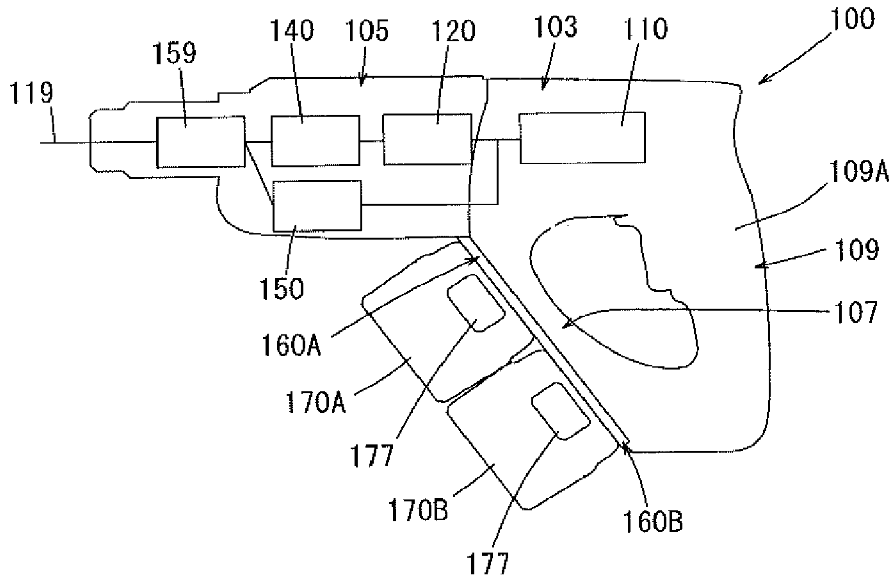
FIG. 13 shows a schematic view of a hammer drill and an arrangement of the battery packs with respect to the hammer drill of a fifth embodiment according to the present disclosure.

Next, a fifth embodiment is explained with reference to FIG. 13. As shown in FIG. 13, in the fifth embodiment, in addition to the third form of the hammer drill described above, the tip end of the grip portion 109A and a lower region of the front end side part of the motor housing 103 are connected by the support member 107 for reinforcing the hand grip, which extends in an inclined manner relative to up-and-down direction (vertical direction). That is, the hand grip 109 comprises the grip portion 109A and the support member 107. The hammer drill 100 according to the fifth embodiment will be hereinafter called a fourth form of the hammer drill, for the sake of convenience. The support member 107 is an example of a feature which corresponds to “a reinforcing member” in the present disclosure.

In the fourth form of the hammer drill 100, two battery mount parts 160A, 160B are provided and aligned in the vertical direction on a front surface region of the support member 107 (on the support member 107). Further, the battery packs 170A, 170B are detachably mounted on the battery mount parts 160A, 160B. The battery packs 170A, 170B are mounted on the battery mount parts 160A, 160B by inserting (sliding) into the battery mount part 160A, 160B in a direction crossing (perpendicular to) the longitudinal direction of the hammer bit 119 from the side of the hammer drill 100. Thus, according to the fifth embodiment, in the fourth form of the hammer drill 100, advantages similar to those described above in the first embodiment can be obtained.

Further, the following modified examples of the first through fifth embodiments are also provided according to the present teachings; however illustrations of the modified examples are omitted for the sake of convenience.

First Modified Example

In a modified version of the first form of the hammer drill 100, the lower surface of the lower connection part **103*b* which connects the motor housing 103 and the hand grip 109 may be formed flush with the lower surface the motor housing 103, and two battery mount parts 160A, 160B may be provided on the lower surface of the motor housing 103 and/or the lower connecting part 103*b* and aligned in the longitudinal direction of the hammer bit 119. Further, the battery packs 170A, 170B are detachably mounted one the battery mount parts 160A, 160B. The battery packs 170A, 170B are mounted on the battery mount parts 160A, 160B by inserting (sliding) into the battery mount part 160A, 160B in a direction crossing the longitudinal direction of the hammer bit 119 from the side of the hammer drill 100**.

Second Modified Example

In a modified version of the second form of the hammer drill 100, one battery mount part 160A may be provided on the lower surface of the tip end of the grip portion 109A and the support member 107, and another battery mount part 160B may be provided so as to be astride the lower surfaces of both of the motor housing 103 and the gear housing 105. The lower surfaces of the motor housing 103 and the gear housing 105 are formed flush with each other. With such a construction, two battery mount parts 160A, 160B are provided spaced apart from each other. Further, the battery packs 170A, 170B are detachably mounted to the battery mount parts 160A, 160B. The battery packs 170A, 170B are mounted on the battery mount parts 160A, 160B by inserting (sliding) into the battery mount part 160A, 160B in a direction crossing the longitudinal direction of the hammer bit 119 from the side of the hammer drill 100.

Third Modified Example

In a modified version of the second form of the hammer drill 100, one battery mount part 160A may be provided on the lower surface of the grip portion 109A and the support member 107, and another battery mount part 160B may be provided on the upper surface of the grip portion 109A. That is, two battery mount parts 160A, 160B are provided spaced apart from each other. Further, the battery pack 170A, 170B are detachably mounted on the battery mount parts 160A, 160B. The battery packs 170A, 170B are mounted on the battery mount parts 160A, 160B by inserting (sliding) into the battery mount parts 160A, 160B in a direction crossing (perpendicular to) the longitudinal direction of the hammer bit 119 from the side of the hammer drill 100.

Fourth Modified Example

In a modified version of the third form of the hammer drill 100, one battery mount part 160A may be provided on the lower surface of the hand grip 109 which is formed as the tip end (free end) of the hand grip 109, and another battery mount part 160B may be provided so as to be astride the lower surfaces of both of the motor housing 103 and the gear housing 105. That is, two battery mount parts 160A, 160B are provided spaced apart from each other. Further, the battery packs 170A, 170B are detachably mounted on the battery mount parts 160A, 160B. The battery packs 170A, 170B are mounted on the battery mount part 160A, 160B by inserting (sliding) into the battery mount part 160A, 160B in a direction crossing the longitudinal direction of the hammer bit 119 from the side of the hammer drill 100.

Fifth Modified Example

In a modified version of the third form of the hammer drill 100, two battery mount parts 160A, 160B may be provided on the upper surface of the rear region of the motor housing 103 and aligned in the longitudinal direction of the hammer bit 119. Further, the battery packs 170A, 170B are detachably mounted on the battery mount parts 160A, 160B. The battery packs 170A, 170B are mounted on the battery mount parts 160A, 160B by inserting (sliding) into the battery mount part 160A, 160B in a direction crossing the longitudinal direction of the hammer bit 119 from the side of the hammer drill 100.

Sixth Modified Example

In a modified version of the fourth form of the hammer drill 100, two battery mount parts 160A, 160B may be provided on the tip end of the hand grip 109 (lower surface of the hand grip 109) and aligned in the longitudinal direction of the hammer bit 119. Further, the battery packs 170A, 170B are detachably mounted on the battery mount parts 160A, 160B. The battery packs 170A, 170B are mounted on the battery mount part s160A, 160B by inserting (sliding) into the battery mount parts 160A, 160B in a direction crossing the longitudinal direction of the hammer bit 119 from the side of the hammer drill 100.

Seventh Modified Example

In a modified version of the fourth form of the hammer drill 100, one battery mount part 160A may be provided on the lower surface of hand grip 109 and another battery mount part 160B may be provided on the front surface of the support member 107. That is, two battery mount parts 160A, 160B are provided spaced apart from each other. Further, the battery packs 170A, 170B are detachably mounted on the battery mount parts 160A, 160B. The battery packs 170A, 170B are mounted on the battery mount parts 160A, 160B by inserting (sliding) into the battery mount parts 160A, 160B in a direction crossing the longitudinal direction of the hammer bit 119 from the side of the hammer drill 100.

Eighth Modified Example

In a modified version of the fourth form of the hammer drill 100, two battery mount parts 160A, 160B may be provided on the lower surface of the gear housing 105 and aligned in the longitudinal direction (front-rear direction) of the hammer bit 119. Further, the battery packs 170A, 170B are detachably mounted on the battery mount parts 160A, 160B. The battery packs 170A, 170B are mounted on the battery mount parts 160A, 160B by inserting (sliding) into the battery mount parts 160A, 160B in a direction crossing the longitudinal direction of the hammer bit 119 from the side of the hammer drill 100.

Sixth Embodiment

Figure 14:
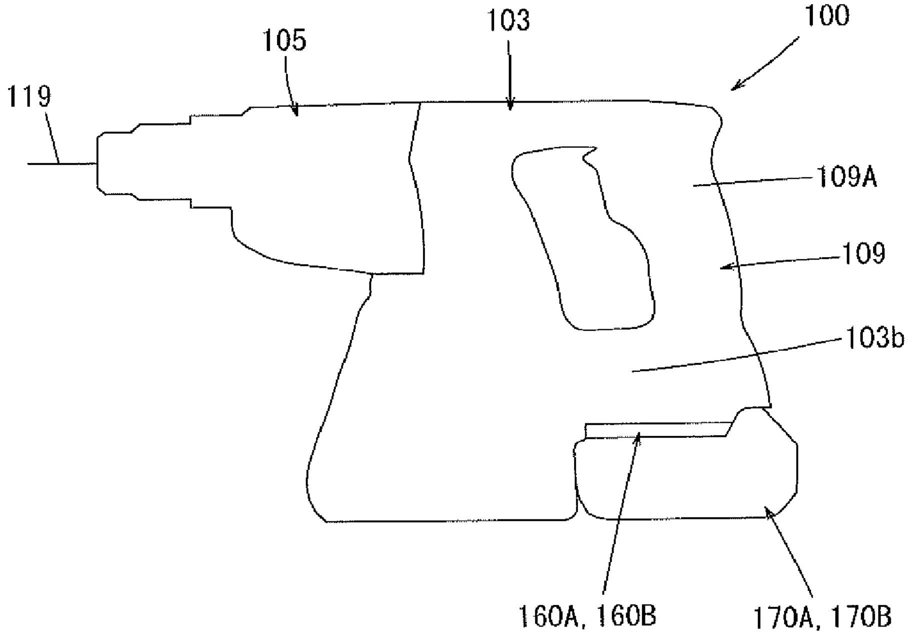
FIG. 14 shows a schematic view of a hammer drill and an arrangement of the battery packs with respect to the hammer drill of a sixth embodiment according to the present disclosure.
Figure 15:
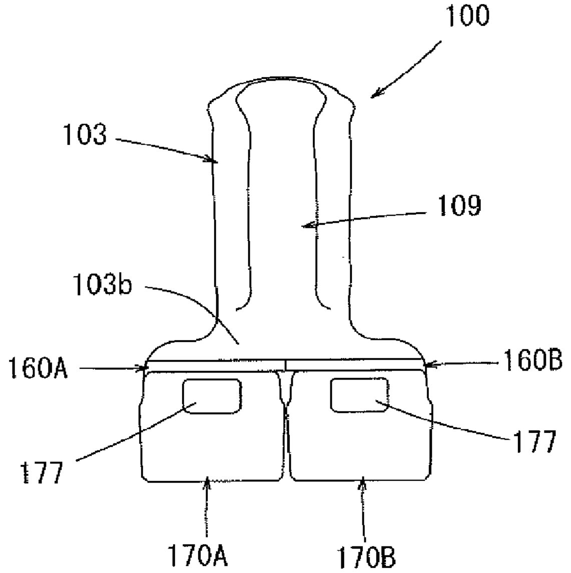
FIG. 15 shows a schematic view of the hammer drill of FIG. 14 when viewed from the rear of the hammer drill.

Next, a sixth embodiment is explained with reference to FIG. 14 and FIG. 15. According to the sixth embodiment, in the first form of the hammer drill 100, two battery mount parts 160A, 160B are arranged on the lower surface of the lower connection part 103*b* that connects the motor housing 103 and the hand grip 109 such that the battery mount parts 160A, 160B are aligned in a direction crossing (perpendicular to) both of the longitudinal direction of the hammer bit 119 and the handle-extending direction of the hand grip 109. In addition, the battery packs 170A, 170B are attached and detached to/from two battery mount parts 160A, 160B by moving (sliding) the battery packs 170A, 170B against the battery mount parts 160A, 160B parallel to the longitudinal direction of the hammer bit 119.

Namely, the battery packs 170A, 170B are attached to the battery mount parts 160A, 160B by moving the battery packs 170A, 170B in a direction from the rear to the front of the hammer drill 100, whereas the battery packs 170A, 170B are detached from the battery mount parts 160A, 160B by moving the battery pack 170A, 170B in the opposite direction (from the front to the rear of the hammer drill 100). Otherwise, the construction of the sixth embodiment is similar to that of the first embodiment. According to the sixth embodiment, the same advantages as the first embodiment can be obtained.

Seventh Embodiment

Figure 16:
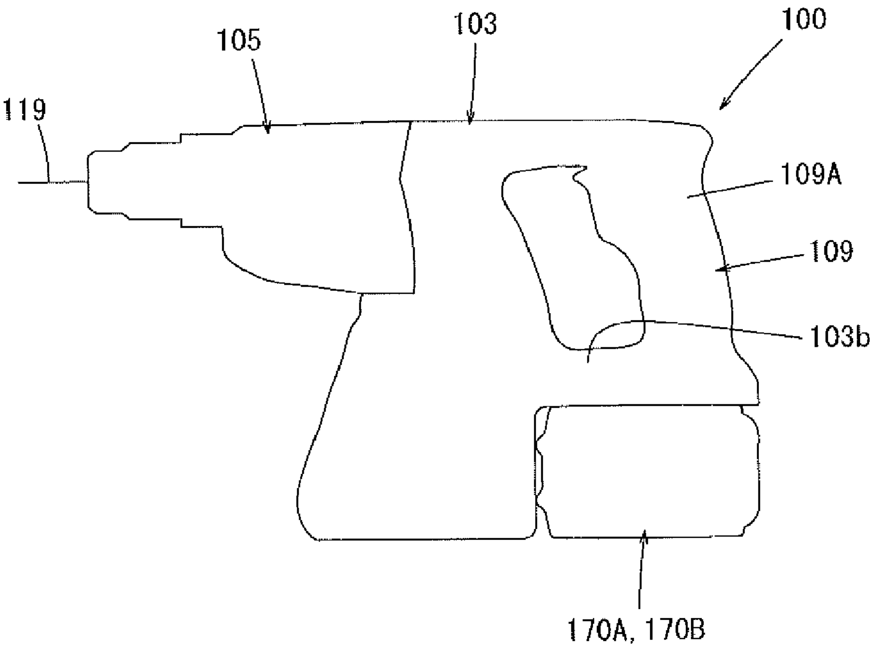
FIG. 16 shows a schematic view of a hammer drill and an arrangement of the battery packs with respect to the hammer drill of a seventh embodiment according to the present disclosure.
Figure 17:
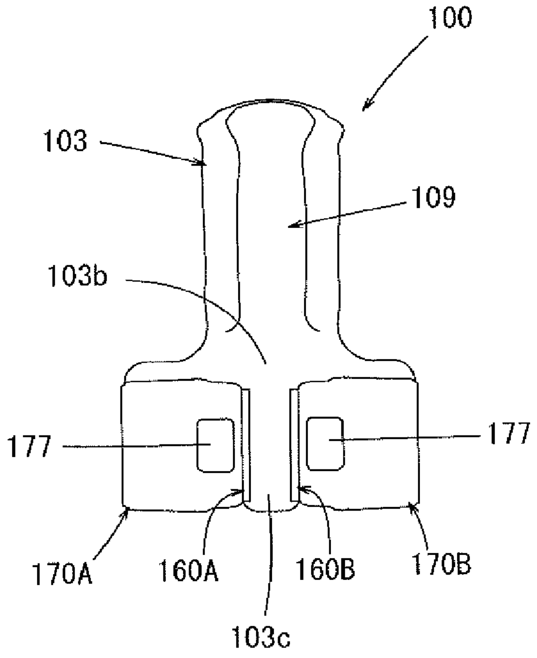
FIG. 17 shows a schematic view of the hammer drill of FIG. 16 when viewed from the rear of the hammer drill.

Next, a seventh embodiment is explained with reference to FIG. 16 and FIG. 17. According to the third embodiment, in the first form of the hammer drill 100, the battery mount parts 160A, 160B are provided on side surfaces of a vertical wall 103*c* which extends downwardly. The vertical wall 103*c* is formed integrally with the lower connection part 103*b* at a lower-center part of the lower connection part 103*b*. Further, the battery mount parts 160A, 160B are provided on the right and left side surfaces of the vertical wall 103*c*, respectively. That is, two battery mount parts 160A, 160B are respectively arranged on the right side and the left side and are separated by the vertical wall 103*c*. Further, the battery packs 170A, 170B are attached to and detached from the battery mount parts 160A, 160B by moving (sliding) the battery packs 170A, 170B relative to the battery mount part 160A, 160B in the front-rear direction (longitudinal direction of the hammer bit 119). Otherwise, the construction of the seventh embodiment is similar to that of the first embodiment.

According to the seventh embodiment, when the hammer drill 100 is placed on the ground, etc., the vertical wall 103*c* is utilized as a stand (pedestal). In such a case, a lower surface of the vertical wall 103*c* is preferably formed flush with a lower surface of the attached battery packs 170A, 170B. Accordingly, when the hammer drill 100 is placed on the ground or a floor, the hammer drill 100 is stably placed.

In the seventh embodiment as well, the same advantage as the first embodiment is obtained.

Figure 18:
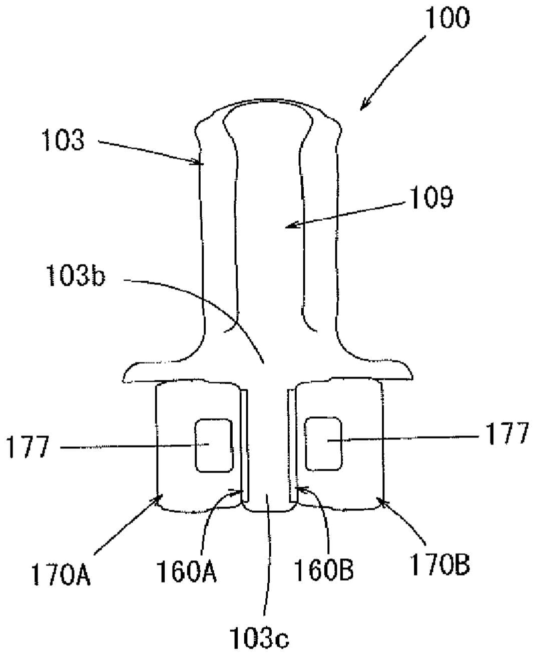
FIG. 18 shows a schematic view of a modified example of the hammer drill of the seventh embodiment.

Further, in the seventh embodiment, as shown in FIG. 18, smaller-size and smaller-capacity battery packs 170A, 170*b* (as compared to the battery packs 170A, 170B shown in FIG. 17) may be utilized. For example, in battery packs having a rated voltage of 18V, the capacity of a normal-size (large-capacity) battery pack (as shown in FIG. 17) is 3 Ah (ampere-hour), whereas the capacity of a smaller-sized battery pack is 1.3 Ah. The smaller-sized, lighter-weight battery pack 170A, 170B is, as shown in FIG. 18, has a shorter depth than the battery pack shown in FIG. 17. Accordingly, the smaller-sized battery packs 170A, 170B have a rectangular parallelepiped shape with the same width and length as the normal-size battery pack, but have a shallower depth. Therefore, even when the smaller-size battery packs 170A, 170B are mounted on the battery mount parts 160A, 160B provided on the right-side and left-side surfaces of the vertical wall 103, the lower surface of the battery packs 170A, 170B, when mounted on the battery mount parts 160A, 160B, are flush with the lower surface of the vertical wall 103*c*. Accordingly, when the hammer drill 100 is placed on the ground or a floor, the hammer drill 100 is stably placed.

Eighth Embodiment

Figure 19:
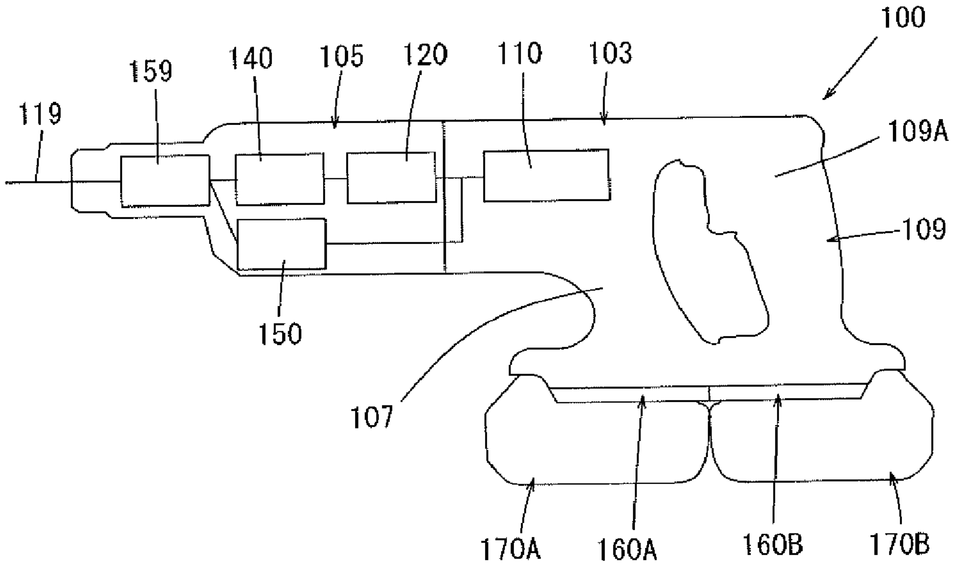
FIG. 19 shows a schematic view of a hammer drill and an arrangement of the battery packs with respect to the hammer drill of an eighth embodiment according to the present disclosure.

Next, an eighth embodiment is explained with reference to FIG. 19. As shown in FIG. 19, the electric motor 110 is arranged such that the rotational axis of a rotary shaft the electric motor 110 is parallel to the hammering axis of the hammer bit 119. In addition, the grip portion 109A of the hand grip 109 is arranged on the hammering axis line. The hand grip 109 is provided with the grip portion 109A and a support member 107. The grip portion 109A extends from a rear-upper end region of the motor housing 103 downwardly and crosses the longitudinal direction of the hammer bit 119. The support member 107 connects the tip end of the grip portion 109A in the handle-extending direction and a rear-lower end region of the motor housing 103. The support member 107 extends in an inclined manner relative to the vertical direction, and is provided to reinforce the hand grip 109A. Rotation of the rotary shaft of the electric motor 110 is converted into a linear motion by the motion converting mechanism 120 and then transmitted as an impact force to the hammer bit 119 held by the tool holder 159 via the hammering mechanism 140. Furthermore, the rotation of the rotary shaft of the electric motor 110 is transmitted as a rotational motion to the hammer bit 119 held by the tool holder 159 via the power transmitting mechanism 150.

In the eighth embodiment, in the second form of the hammer drill 100 described above, two battery mount parts 160A, 160B are provided and aligned in the longitudinal direction of the hammer bit 119 on the lower surface of the tip end of the grip portion 109A and the support member 107. Further, the battery pack 170A is mounted on the battery mount part 160A by moving it toward the rear side of the hammer drill 100. In other words, the battery pack 170A is mounted on the battery mount part 160A by moving in a direction close to the rear side battery mount part 160B. On the other hand, the battery pack 170B is mounted on the battery mount part 160B by moving it toward the front side of the hammer drill 100. In other words, the battery pack 170B is mounted on the battery mount part 160B by moving in a direction close to the front side battery mount part 160A. Further, each battery pack 170A, 170B is detached by moving in a direction opposite to the respective attaching direction. Otherwise, the construction of the eighth embodiment is similar to that of the first embodiment.

According to the eighth embodiment, two battery mount parts 160A, 160B are constructed such that the battery packs 170A, 170B, when mounted on the respective battery mount parts 160A, 160B, are arranged face to face in the longitudinal direction of the hammer bit 119. Further, because the longitudinal direction of two battery packs 170A, 170B is parallel to the longitudinal direction of the hammer bit 119, the battery packs 170A, 170B do not protrude laterally outward from the sides of the main body 101. According to the eighth embodiment, substantially the same advantages as the first embodiment can be obtained.

Ninth Embodiment

Figure 20:
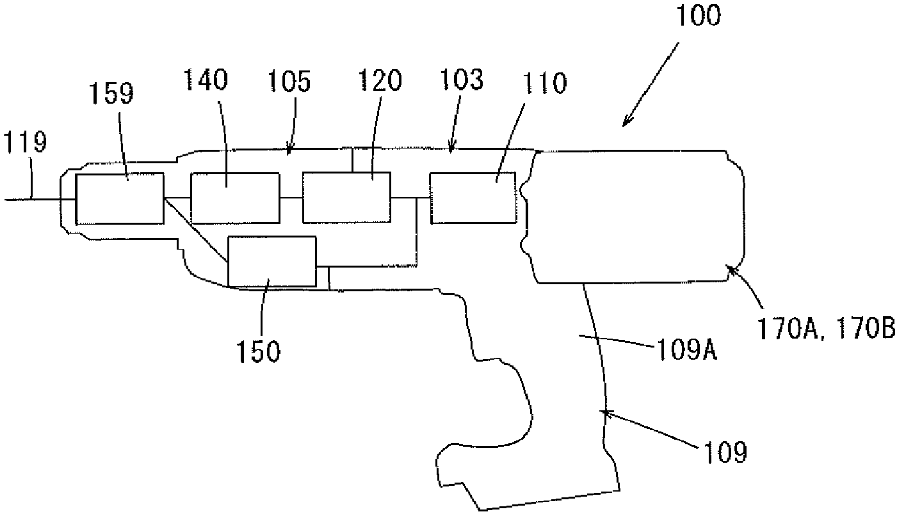
FIG. 20 shows a schematic view of a hammer drill and an arrangement of the battery packs with respect to the hammer drill of a ninth embodiment according to the present disclosure.
Figure 21:
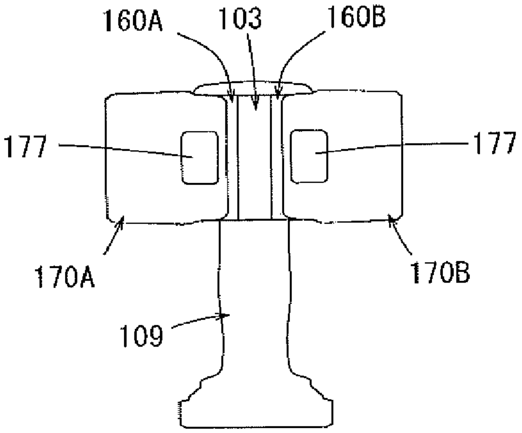
FIG. 21 shows a schematic view of the hammer drill of FIG. 20 when viewed from the rear of the hammer drill.

Next, a ninth embodiment is explained with reference to FIG. 20 and FIG. 21. As shown in FIG. 20 and FIG. 21, in the ninth embodiment, the grip portion 109A of the hand grip 109 extends from a rear end region of the motor housing 103 downwardly and crosses the longitudinal direction of the hammer bit 119.

In the ninth embodiment, in the third form of the hammer drill 100 described above, the battery mount parts 160A, 160B are arranged on the right and left side surfaces of the motor housing 103 in a rear region of the motor housing 103 in the longitudinal direction of the hammer bit 119. That is, two battery mount parts 160A, 160B are arranged at two points on the right and left of the motor housing 103 and are separated by the motor housing 103. Further, the battery packs 170A, 170B are mounted on the battery mount parts 160A, 160B by moving (sliding) the battery packs 170A, 170B from the rear side to the front side of the hammer drill 100, and the battery packs 170A, 170B are detached from the battery mount parts 160A, 160B by moving (sliding) the battery packs 170A, 170B from the front side to the rear side of the hammer drill 100. Otherwise, the construction of the ninth embodiment is similar to that of the first embodiment.

According to the ninth embodiment, the battery packs 170A, 170B are arranged on both sides of the hammering axis of the hammer bit 119. Therefore, the center of gravity of the hammer drill 100 is arranged proximal to the hammering axis in the vertical direction that is perpendicular to the longitudinal direction of the hammer bit 119. Thus, moments around the center of gravity of the hammer drill 100 are reduced while the hammer bit 119 is performing the hammering operation. According to the ninth embodiment, substantially the same advantages as the first embodiment can be obtained.

Tenth Embodiment

Figure 22:
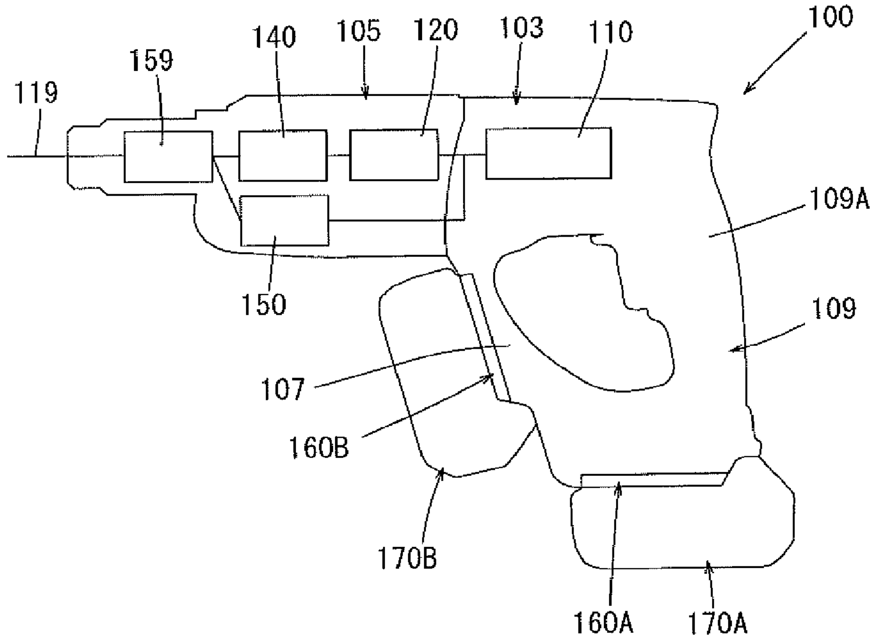
FIG. 22 shows a schematic view of a hammer drill and an arrangement of the battery packs with respect to the hammer drill of a tenth embodiment according to the present disclosure.

Next, a tenth embodiment is explained with reference to FIG. 22. As shown in FIG. 22, in the tenth embodiment, in the fourth form of the hammer drill 100, one battery mount part 160A is arranged on the lower end part of the grip portion 109A as a tip end of the hand grip 109, and another battery mount part 160B is arranged on the front surface of the support member 107. That is, two battery mount parts 160A, 160B are arranged so as to be separated in the front-rear direction by the hand grip 109. Further, one battery pack 170A is moved from the rear to the front of the hammer drill 100 and mounted on one battery mount part 170A. Further, another battery pack 170B is moved upwardly from below the hammer drill 100 and mounted on the other battery mount part 170B. Otherwise, the construction of the tenth embodiment is similar to that of the first embodiment.

According to the tenth embodiment, two battery packs 170A, 170B are rationally arranged at two spaced-apart points by utilizing the grip portion 109A of the hand grip 109 and the support member 107. According to the tenth embodiment, substantially the same advantages as the first embodiment can be obtained.

Eleventh Embodiment

Next, an eleventh embodiment is explained with reference to FIG. 23. In the eleventh embodiment, in the first form of the hammer drill 100, the lower surface of the lower connection part 103*b* which connects the motor housing 103 and the hand grip 109 is formed as a non-stepped planar shape.

Figure 23:
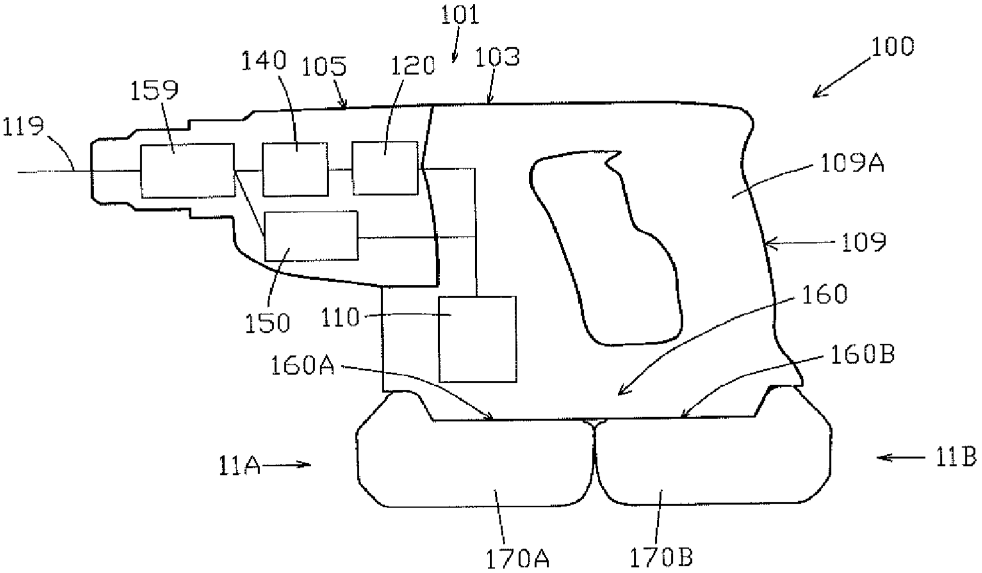
FIG. 23 shows a schematic view of a hammer drill and an arrangement of the battery packs with respect to the hammer drill of an eleventh embodiment according to the present disclosure.

Further, in FIG. 23, although the electric motor 110 is arranged such that the rotational axis of the rotary shaft of the electric motor 110 is perpendicular to the driving axis of the hammer bit 119, the electric motor 110 may instead be arranged such that the rotational axis of the rotary shaft of the electric motor 110 is inclined relative to the vertical direction and intersects the driving axis of the hammer bit 119.

Further, two battery mount parts 160A, 160B are provided and aligned in the longitudinal direction of the hammer bit 119 (front-rear direction) on the lower surface of the lower connection part 103*b*. Further, one battery pack 170A is mounted on one battery mount part 160A by moving (sliding) the battery pack 170A in a direction close to the other battery mount part 160B. On the other hand, the other battery pack 170B is mounted on the other battery mount part 160B by moving (sliding) the battery pack 170B in a direction close to the one battery mount part 160A. That is, the one battery pack 170A is mounted on the battery mount part 160A by sliding relative to the battery mount part 160A in the direction of arrow 11A. On the other hand, the other battery pack 170B is mounted on the other battery mount part 160B by sliding relative to the other battery mount part 160B in the direction of arrow 11B. The directions of the arrows 11A and 11B are parallel to a driving axis-extending direction along which the driving axis of the hammer bit 119 extends. Otherwise, the construction of the eleventh embodiment is similar to that of the first embodiment.

According to the eleventh embodiment, in the first form of the hammer drill 100, two battery mount parts 160A, 160B are rationally arranged by utilizing the lower surfaces of the motor housing 103 and the hand grip 109. According to the eleventh embodiment, substantially the same advantages as the first embodiment can be obtained.

Twelfth Embodiment

Figure 24:
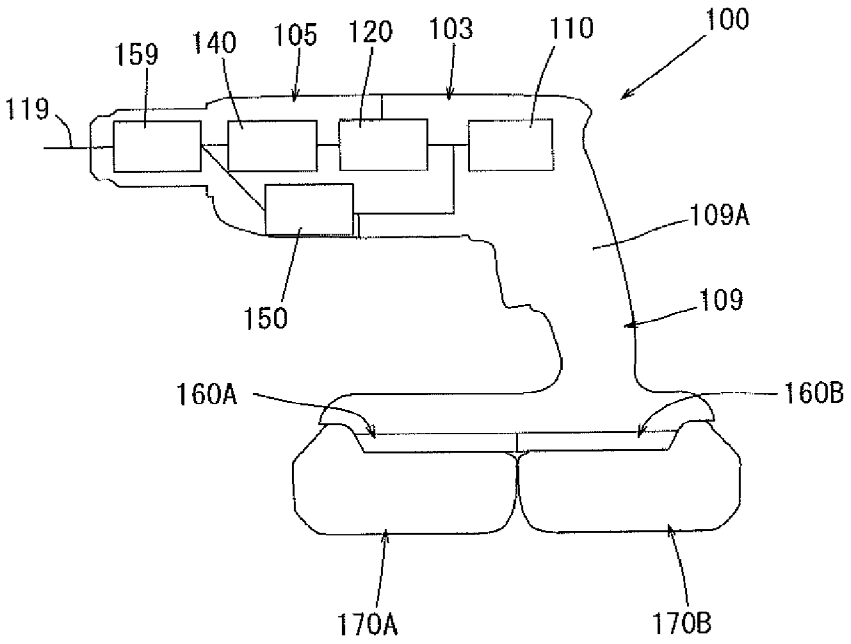
FIG. 24 shows a schematic view of a hammer drill and an arrangement of the battery packs with respect to the hammer drill of a twelfth embodiment according to the present disclosure.

Next, a twelfth embodiment is explained with reference to FIG. 24. In the twelfth embodiment, in the third form of the hammer drill 100, two battery mount parts 160A, 160B are provided and aligned in the longitudinal direction of the hammer bit 119 (front-rear direction) on the lower surface of the tip end of the hand grip 109. Further, the one battery pack 170A is mounted on the one battery mount part 160A by moving (sliding) the one battery pack 170A in a direction close to the other battery mount part 160B. On the other hand, the other battery pack 170B is mounted on the other battery mount part 160B by moving (sliding) the other battery pack 170B in a direction close to the one battery mount part 160A. Otherwise, the construction of the twelfth embodiment is similar to that of the first embodiment.

According to the twelfth embodiment, in the third form of the hammer drill 100, two battery mount parts 160A, 160B are rationally arranged by utilizing the lower surface of the tip end of the hand grip 109. According to the twelfth embodiment, substantially the same advantages as the first embodiment can be obtained.

Thirteenth Embodiment

Figure 25:
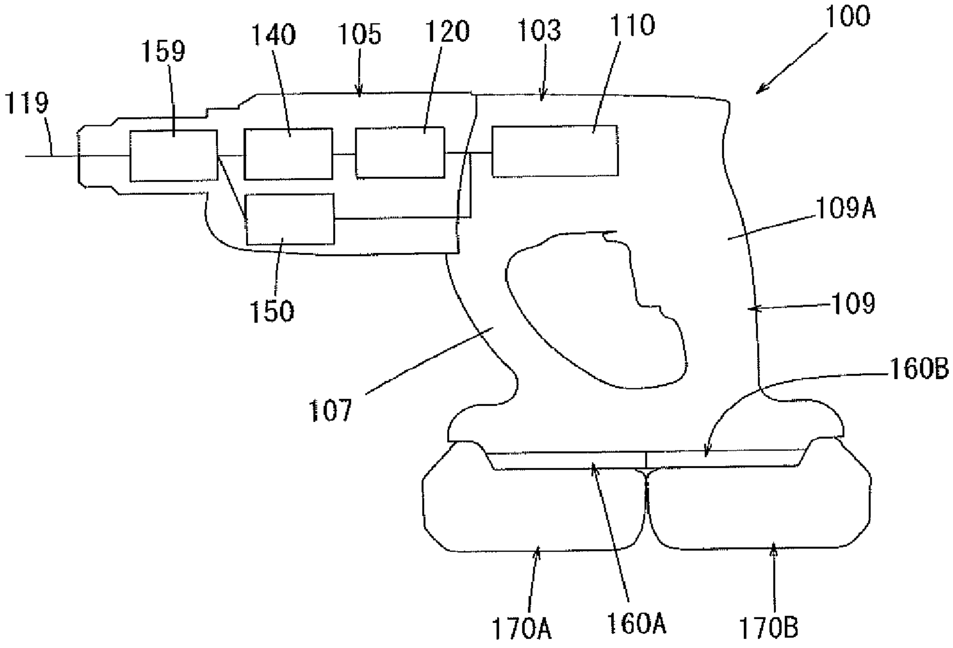
FIG. 25 shows a schematic view of a hammer drill and an arrangement of the battery packs with respect to the hammer drill of a thirteenth embodiment according to the present disclosure.

Next, a thirteenth embodiment is explained with reference to FIG. 25. In the thirteenth embodiment, in the fourth form of the hammer drill 100, a lower surface of the grip portion 109A of the hand grip 109 and a lower surface of the support member 107 which connects the tip end of the grip portion 109A and the motor housing 103 are formed as a single flat surface. Further, two battery mount parts 160A, 160B are provided and aligned in the longitudinal direction of the hammer bit 119 (front-rear direction) on the flat surface. Further, the one battery pack 170A is mounted on the one battery mount part 160A by moving (sliding) the one battery pack 170A in a direction close to the other battery mount part 160B. On the other hand, the other battery pack 170B is mounted on the other battery mount part 160B by moving (sliding) the other battery pack 170B in a direction close to the one battery mount part 160A. Otherwise, the construction of the thirteenth embodiment is similar to that of the first embodiment.

According to the thirteenth embodiment, in the fourth form of the hammer drill 100, two battery mount parts 160A, 160B are rationally arranged by utilizing the lower surfaces of the grip portion 109A and the support member 107. According to the thirteenth embodiment, substantially the same advantages as the first embodiment can be obtained.

Fourteenth Embodiment

Figure 26:
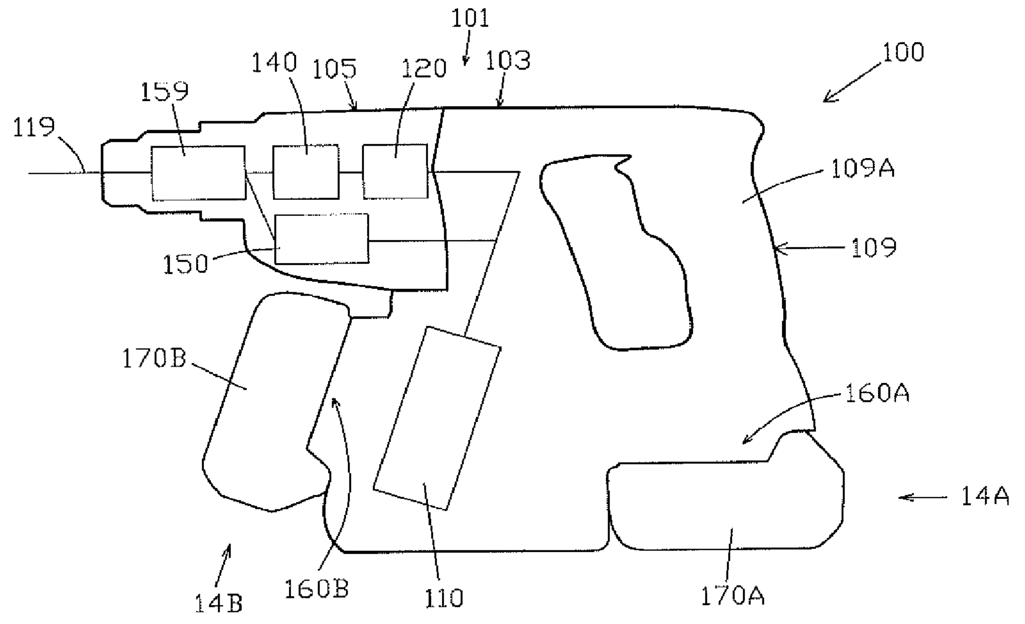
FIG. 26 shows a schematic view of a hammer drill and an arrangement of the battery packs with respect to the hammer drill of a fourteenth embodiment according to the present disclosure.

Next, a fourteenth embodiment is explained with reference to FIG. 26. In the fourteenth embodiment, in the first form of the hammer drill 100, the one battery mount part 160A is arranged on the lower surface of the lower connection part 103*b* which connects the motor housing 103 and the handgrip 109. On the other hand, the other battery mount part 160B is arranged on a front surface of the lower region of the motor housing 103. That is, two battery mount parts 160A, 160B are spaced apart by the motor housing 103. Further, the one battery pack 170A is mounted on the one battery mount part 160A by moving (sliding) the one battery pack 170A in a direction parallel to the longitudinal direction of the hammer bit 119. On the other hand, the other battery pack 170B is mounted on the other battery mount part 160B by moving (sliding) the other battery pack 170B in the vertical direction of the hammer drill 100. That is, the one battery pack 170A is mounted on the one battery mount part 160A by sliding relative to the one battery mount part 160A in the direction of arrow 14A. On the other hand, the other battery pack 170B is mounted on the other battery mount part 160B by sliding relative to the other battery mount part 160B in the direction of arrow 14B. Further, the directions of the arrows 14A and 14B are parallel to a virtual plane that includes the driving axis of the hammer bit 119 and the handle-extending axis along which the grip portion 109A of the hand grip 109 extends. The direction of arrow 14A intersects the direction of arrow 14B. Accordingly, the longitudinal direction of the one battery pack 170A mounted on the one battery mount part 160A intersects the longitudinal direction of the other battery pack 170B mounted on the other battery mount part 160B. Otherwise, the construction of the fourteenth embodiment is similar to that of the first embodiment.

According to the fourteenth embodiment, in the first form of the hammer drill 100, two battery mount parts 160A, 160B are rationally arranged by utilizing the lower surface of the lower connection part 103*b* and the front surface of the lower region of the motor housing 103. According to the fourteenth embodiment, substantially the same advantages as the first embodiment can be obtained.

Fifteenth Embodiment

Figure 27:
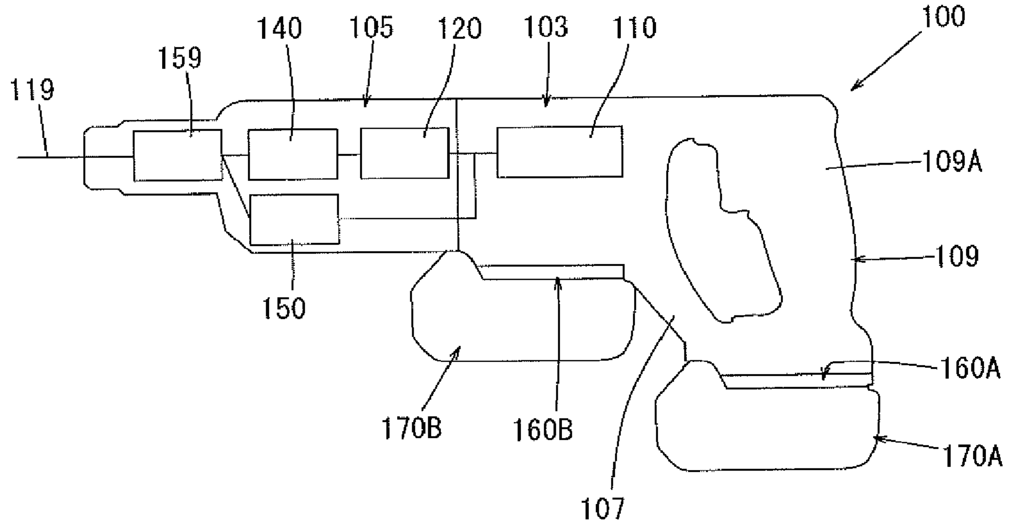
FIG. 27 shows a schematic view of a hammer drill and an arrangement of the battery packs with respect to the hammer drill of a fifteenth embodiment according to the present disclosure.

Next, a fifteenth embodiment is explained with reference to FIG. 27. In the fifteenth embodiment, in the second form of the hammer drill 100, the one battery mount part 160A is arranged on the lower surface of the tip end of the grip part 109A and the support member 107, and the other battery mount part 160B is arranged on the lower surface of the motor housing 103. That is, the two battery mount parts 160A, 160B are spaced apart in the front-rear direction by the motor housing 103 and the hand grip 109. Further, the battery packs 170A, 170B are respectively mounted on the battery mount parts 160A, 160B by moving (sliding) the battery packs 170A, 170B in a direction parallel to the longitudinal direction of the hammer bit 119. Otherwise, the construction of the fifteenth embodiment is similar to that of the first embodiment.

According to the fifteenth embodiment, in the second form of the hammer drill 100, two battery mount parts 160A, 160B are rationally arranged by utilizing the lower surface of the tip end of the grip portion 109A and the support member 107 and a part of the motor housing 103. According to the fifteenth embodiment, substantially the same advantages as the first embodiment can be obtained.

Sixteenth Embodiment

Figure 28:
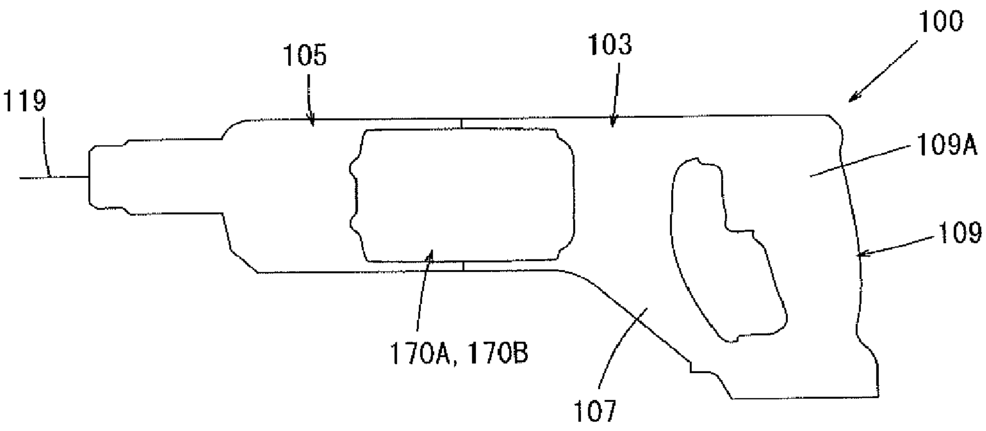
FIG. 28 shows a schematic view of a hammer drill and an arrangement of the battery packs with respect to the hammer drill of a sixteenth embodiment according to the present disclosure.
Figure 29:
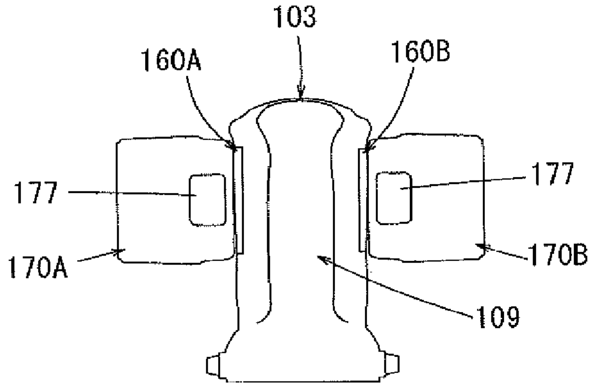
FIG. 29 shows a schematic view of the hammer drill of FIG. 28 when viewed from the rear of the hammer drill.

Next, a sixteenth embodiment is explained with reference to FIG. 28 and FIG. 29. In the sixteenth embodiment, in the second form of the hammer drill 100, the battery mount parts 160A, 160B are arranged on the right and left side surfaces of the motor housing 103 and the gear housing 105 so as to be astride both of the motor housing 103 and the gear housing 105. That is, two battery mount parts 160A, 160B are spaced apart at two points one the right and left side surfaces by the motor housing 103 and the gear housing 105. Further, the battery packs 170A, 170B are mounted on the battery mount parts 160A, 160B by moving (sliding) the battery packs 170A, 170B in a direction from the rear to the front of the hammer drill 100 and are detached from the battery mount parts 160A, 160B by moving (sliding) the battery packs 170A, 170B in a direction from the front to the rear of the hammer drill 100. Otherwise, the construction of the sixteenth embodiment is similar to that of the first embodiment.

According to the sixteenth embodiment, the battery packs 170A, 170B are arranged on both sides of the hammering axis of the hammer big 119. Therefore, the center of gravity of the hammer drill 100 is arranged proximal to the hammering axis in the vertical direction crossing the longitudinal direction of the hammer bit 119. Thus, moments around the center of gravity of the hammer drill 100 are reduced while the hammer bit 119 is performing during a hammering operation. According to the sixteenth embodiment, substantially the same advantages as the first embodiment can be obtained.

Seventeenth Embodiment

Figure 30:
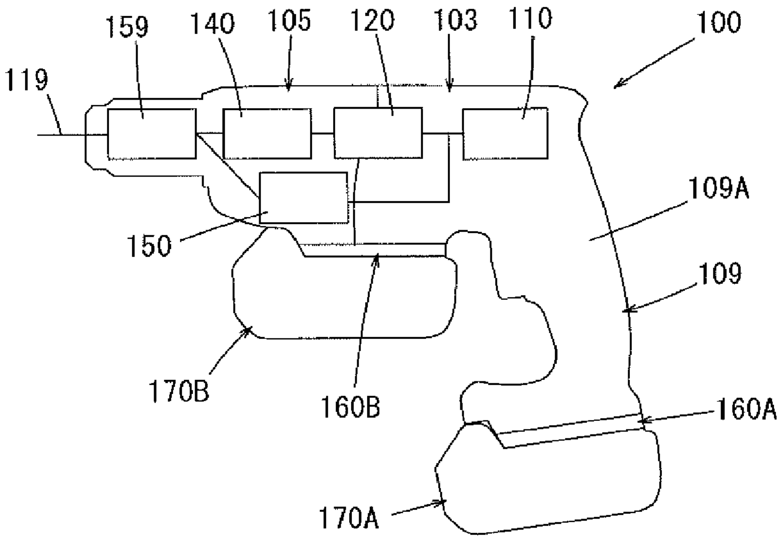
FIG. 30 shows a schematic view of a hammer drill and an arrangement of the battery packs with respect to the hammer drill of a seventeenth embodiment according to the present disclosure.

Next, a seventeenth embodiment is explained with reference to FIG. 30. In the seventeenth embodiment, in the third form of the hammer drill 100, the one battery mount part 160A is arranged on the tip end of the hand grip 109 and the other battery mount part 160B is arranged on the lower surfaces of the motor housing 103 and the gear housing 105. The lower surface of the motor housing 103 is formed flush with the lower surface of the gear housing 105. Therefore, the two battery mount parts 160A, 160B are spaced apart by the motor housing 103 and the gear housing 105. Further, the battery packs 170A, 170B are mounted on the battery mount parts 160A, 160B by moving (sliding) the battery packs 170A, 170B in the longitudinal direction of the hammer bit 119 relative to the two battery mount parts 160A, 160B.

Eighteenth Embodiment

Figure 31:
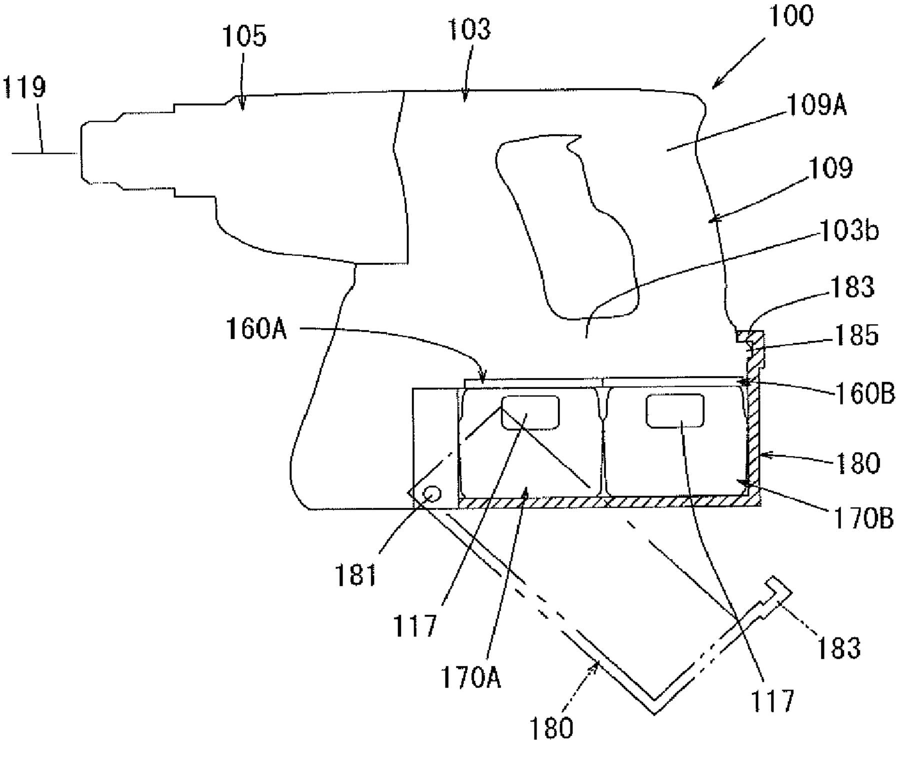
FIG. 31 shows a schematic view of a hammer drill of an eighteenth embodiment according to the present disclosure.

Next, an eighteenth embodiment is explained with reference to FIG. 31. In the eighteenth embodiment, the battery packs 170A, 170B, which are mounted on the lower surface of the lower connection part 103 so as to be aligned in the front-rear direction, are covered by a rotatable (pivotable) cover member 180. The cover member 180 is made of elastomer and the cover member 180 is a boxed member formed as substantially rectangular parallelepiped having opened upper and front surfaces. A front-rear part of the cover member 180 is rotatably mounted on the motor housing 103 via a support shaft 181. Accordingly, the cover member 180 is rotated upward and thereby the entirety of the battery packs 170A, 170B is covered by the cover member 180 as illustrated by a solid line in FIG. 31. On the other hand, when the cover member 180 is rotated downward, the battery packs 170A, 170B are exposed as illustrated by a chain double-dashed line in FIG. 31. Thus, detachment of the battery packs 170A, 170B is possible. Further, the cover member 180 comprises an engagement recess 183; when the cover member 180 is rotated upward, the engagement recess 183 is engaged with an engagement protrusion 185 formed at a rear end part of the lower connection part 103*b*. Accordingly, the cover member 180 is held in its closed position.

According to the eighteenth embodiment, the battery packs 170A, 170B, when mounted on the lower surface of the lower connection part 103*b*, are covered by the cover member 180. With such a construction, a dust proof effect and a water proof effect with respect to the battery packs 170A, 170B are obtained. In addition, the battery packs 170A, 170B are prevented by the cover member 180 from inadvertently falling off. Furthermore, the cover member 180 protects the battery packs 170A, 170B from external forces.

In the eighteenth embodiment, the cover member 180 is mounted on the motor housing 103 in an undetachable manner, however it is not limited to this. For example, the cover member 180 may be mounted on the motor housing 103 in a detachable manner. In such an embodiment, the cover member may be attached to a plurality of the battery packs and thereby integrating the plurality of the battery packs. That is, the plurality of the battery packs is disposed inside the cover member and thereby an assembly of the plurality of the battery packs and the cover member is formed. In this assembly, the terminals and the mount guides of the plurality of the battery packs are exposed from the cover member for mounting to the battery mount parts. Further, when the assembly is mounted onto the battery mount parts, the cover member is in contact with the battery mount parts. With such a construction, the battery packs are sealed by the cover member.

As described above, in an aspect to form the assembly, the cover member is attached and detached as needed. Further, the plurality of battery packs can be attached to the battery mount parts in a single attaching operation. Further, the plurality of battery packs, even when detached from the hammer drill, are integrally held. Accordingly, loss of the battery packs is prevented.

Further, the cover member 180 may be applicable to hammering tools other than the hammer drill 100. Moreover, in addition to hammering tools, the present disclosure is applicable to other types of power tools such as an electric driver, an electric wrench, an electric grinder, an electric reciprocating saw, an electric jigsaw and so on, on which a plurality of battery packs can be mounted.

Nineteenth Embodiment

Figure 32:
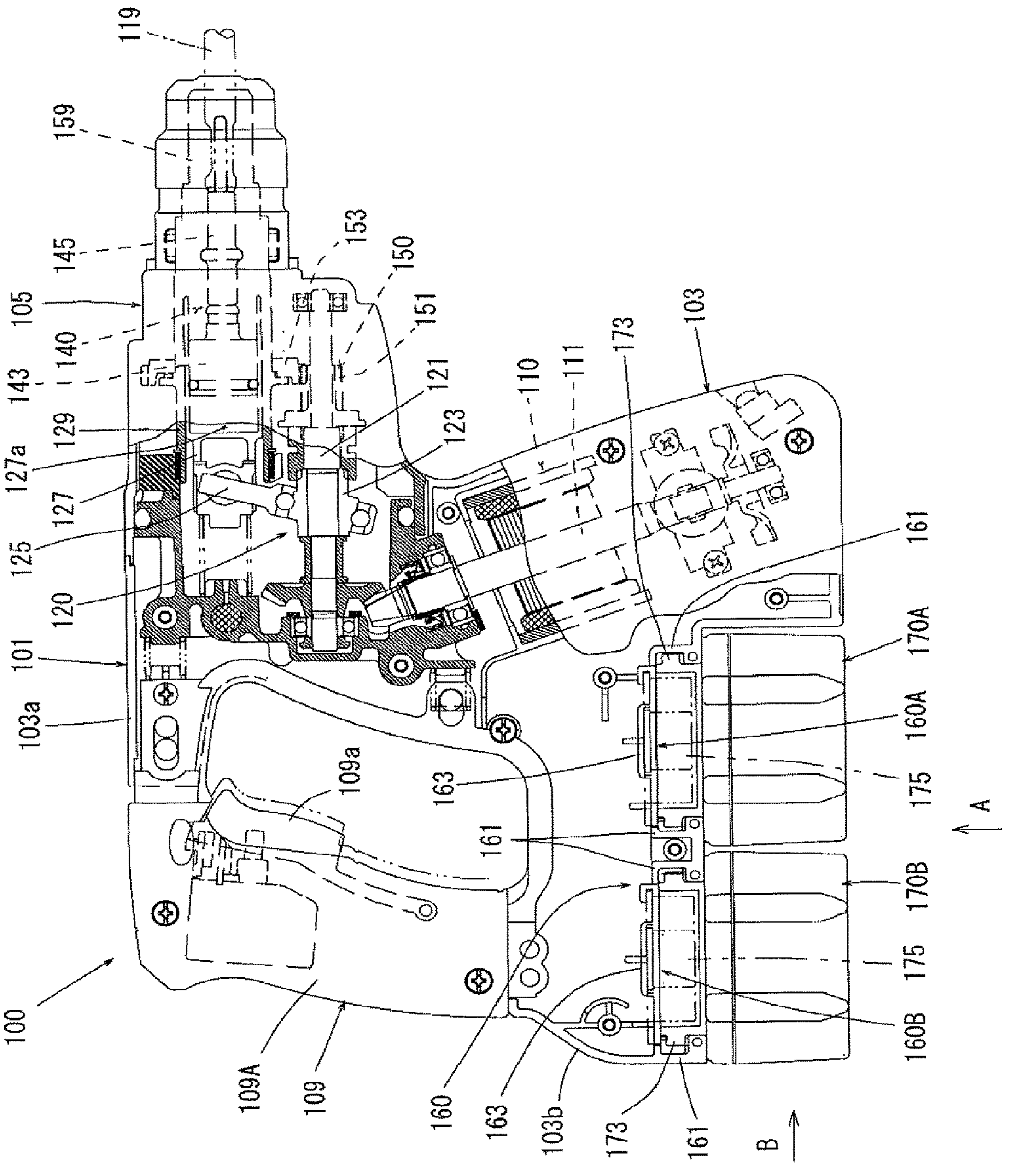
FIG. 32 shows a partial cross sectional view of a hammer drill of a nineteenth embodiment according to the present disclosure.

Next, a nineteenth embodiment is explained with reference to FIG. 32 and FIG. 33. In the nineteenth embodiment, with respect to the two (front and rear) battery mount parts 160A, 160B when viewed from the rear of the hammer drill 100, the attaching direction of the battery packs 170A, 170B is defined by a moving (sliding) direction from the left side to the right side of the hammer drill 100 (the direction shown by arrow F in FIG. 33), while the detaching direction of the battery packs 170A, 170B is defined as the opposite moving direction (i.e. from right to left). That is, both battery packs 170A, 170B are respectively mounted on the two (front and rear) battery mount parts 160A, 160B by moving in the same direction.

Further, the two (front and rear) battery mount parts 160A, 160B are formed such that the center of gravity of each battery pack 170A, 170B, when mounted on the respective battery mount parts 160A, 160B, is located on a plane that includes the driving axis of the hammer bit 119 and the center axis (handle-extending direction) of the hand grip 109. Otherwise, the construction of the nineteenth embodiment is similar to that of the first embodiment.

Thus, according to the nineteenth embodiment, when the battery packs 170A, 170B are respectively mounted on the two (front and rear) battery mount parts 160A, 160B, the center of gravity of each of the battery packs 170A, 170B is located on a plane that includes the driving axis of the hammer bit 119 and the center axis (handle-extending direction) of the hand grip 109. With such a construction, the batteries 170A, 170B can be balanced in weight with respect to the lateral direction of the hammer drill 100, thereby providing an ergonomic design.

Furthermore, according to the nineteenth embodiment, the battery packs 170A, 170B are mounted on the battery mount parts 160A, 160B by respectively sliding the mount guides 173 of the battery packs 170A, 170B along the guide rails 161 of the battery mount part 160A, 160B. Accordingly, the battery packs 170A, 170B can be easily mounted.

Figure 33:
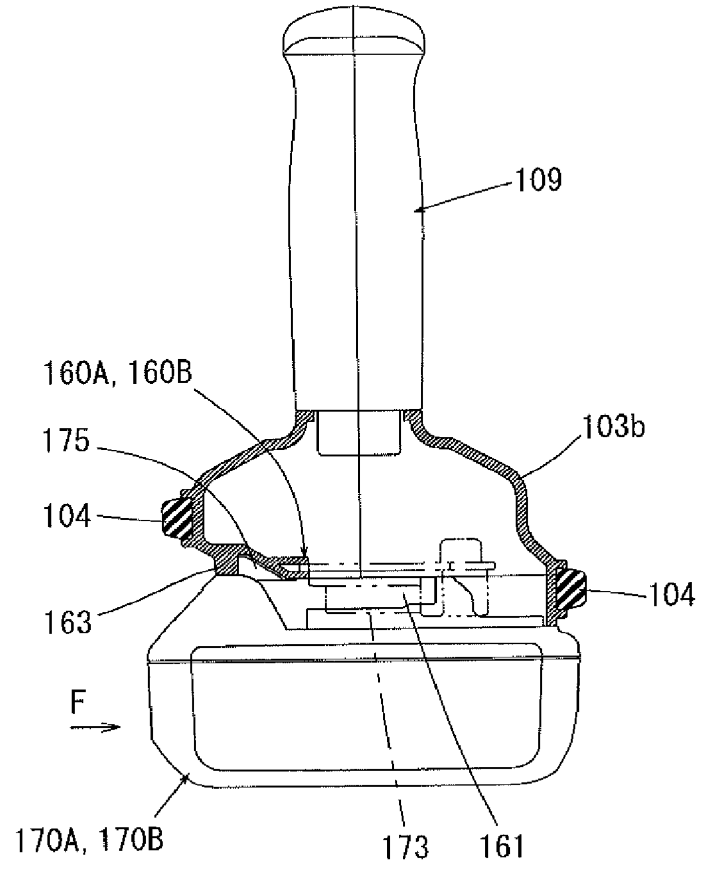
FIG. 33 shows a partial cross sectional view of the hammer drill of FIG. 32 in the direction of arrow B in FIG. 32.

Furthermore, according to the nineteenth embodiment, as shown in FIG. 33, an elastomer 104 formed as an elastic member for cushioning is installed on each lateral outer surface of the lower connection part 103*b* of the motor housing 103 and extends in the front-rear direction. Thus, if the hammer drill 100 is placed on the ground in a sideways (tipped over) posture such that one of its side surfaces contacts the ground, the elastomer 104 will contact the ground. With such a construction, the end surfaces in the longitudinal direction of the battery packs 170A, 170B can be prevented from directly contacting the ground in such a situation, thereby protecting the battery packs 170A, 170B from being damaged due to contact with the ground.

Twentieth Embodiment

Figure 34:
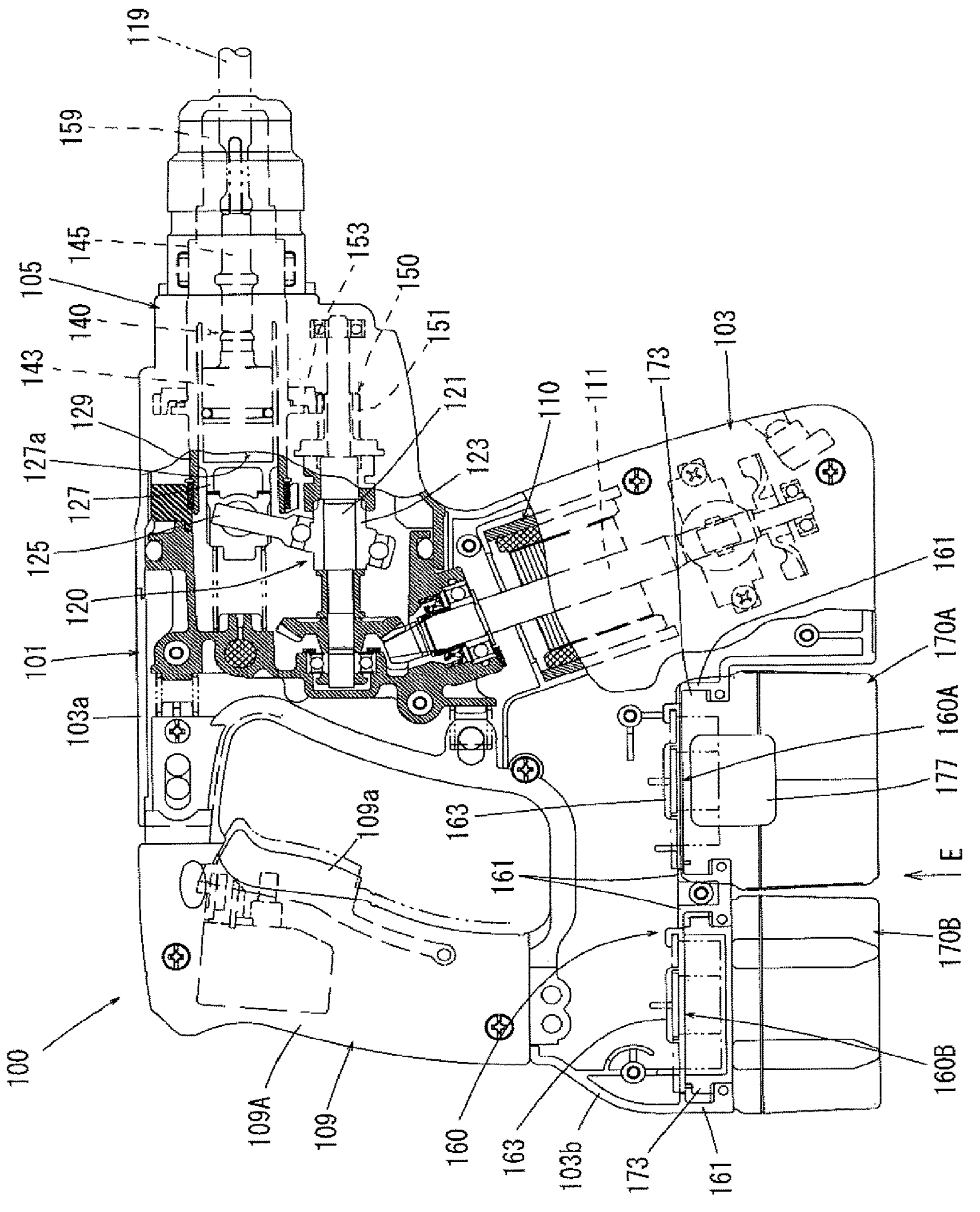
FIG. 34 shows a partial cross sectional view of a hammer drill of a twentieth embodiment according to the present disclosure.
Figure 35:
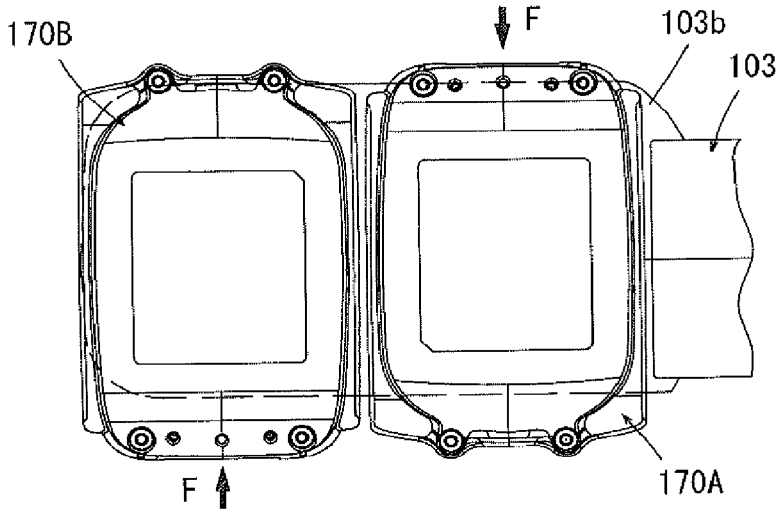
FIG. 35 shows a view of the hammer drill of FIG. 34 in the direction of arrow E in FIG. 34.
Figure 36:
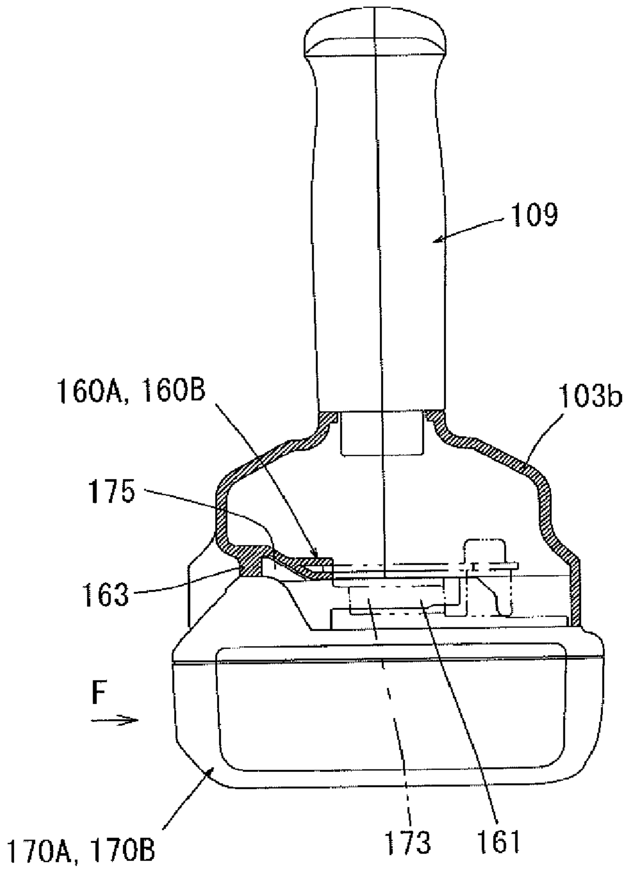
FIG. 36 shows a partial cross sectional view of the hammer drill of FIG. 34 when viewed from the rear side of the hammer drill in FIG. 34.

Next, a twentieth embodiment of the present disclosure is explained with reference to FIG. 34 to FIG. 36. As shown in FIG. 34 to FIG. 36, the twentieth embodiment is designed such that the two (front and rear) battery packs 170A, 170B are mounted by respectively inserting them from opposite sides of the hammer drill 100 (in a direction crossing both of the longitudinal direction of the hammer bit 119 and an extending direction of the hand grip 109), i.e. the inserting directions of the two battery packs 170A, 170B are set to be opposite to each other. Otherwise, the construction of the twentieth embodiment is similar to the hammer drill 100 according to the nineteenth embodiment.

In the twentieth embodiment, with respect to components of two (front and rear) battery mount parts 160A, 160B, the arrangement and direction of the engagement part 163 and the terminal 165 of the front battery mount part 160A are formed opposite to those of the rear battery mount part 160B. With such a construction, as shown by arrows Fin FIG. 35, one (front) battery pack 170A is mounted on one of the battery mount parts by moving the battery pack 170A from the right side to the left side of the hammer drill 100, whereas the other (rear) battery pack 170B is mounted on the other battery mount part by moving the battery pack 170B from the left side to the right side of the hammer drill 100.

According to the twentieth embodiment, two (even number) of the battery packs 170A, 170B are moved in opposite directions relative to the hammer drill 100 to be mounted. With such a construction, the combined center of gravity of the battery packs 170A, 170B is located on a plane that includes the driving axis of the hammer bit 119 and the center axis of the hand grip 109. Therefore, it is not necessary to set the battery mount parts 160A, 160B in order to place the combined center of gravity of the battery packs 170A, 170B on the plane that includes the driving axis of the hammer bit 119 and the center axis of the hand grip 109. Further, apart from the above, similar advantages as the first embodiment can obtained.

Twenty-First Embodiment

Figure 37:
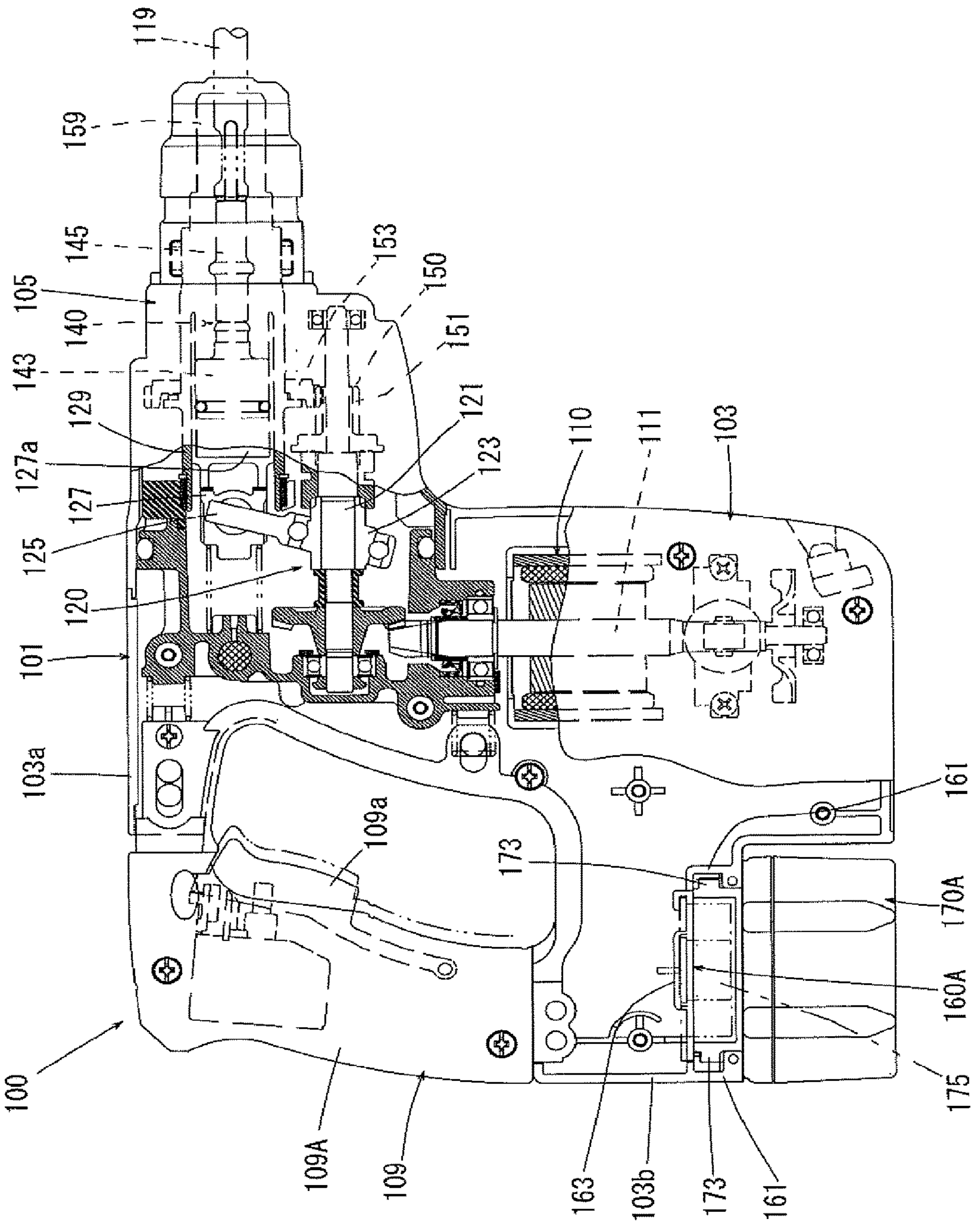
FIG. 37 shows a partial cross sectional view of a hammer drill of a twenty-first embodiment according to the present disclosure.
Figure 38:
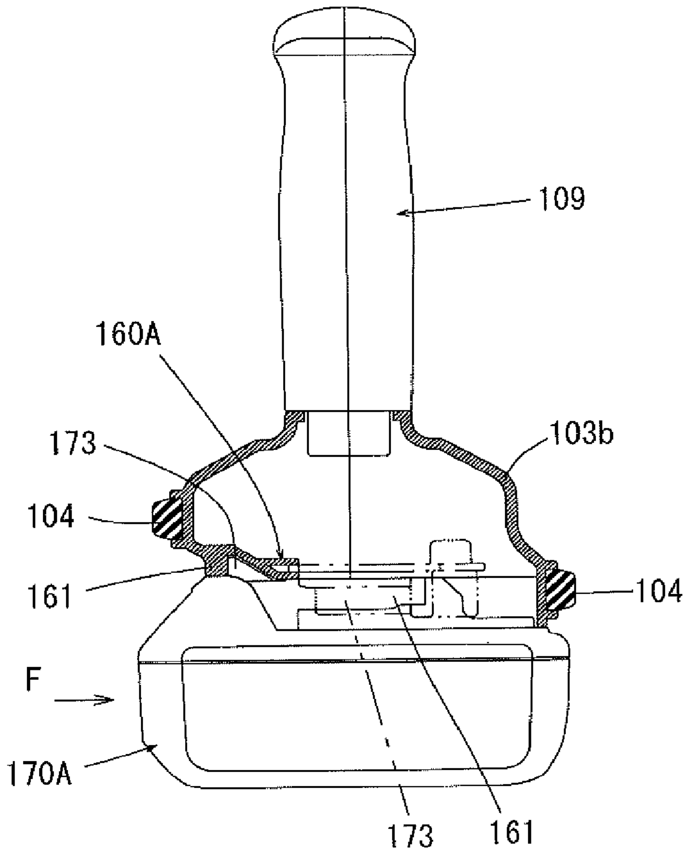
FIG. 38 shows a partial cross sectional view of the hammer drill of FIG. 37 when viewed from the rear side of the hammer drill in FIG. 37.

Next, a twenty-first embodiment of the present disclosure is explained with reference to FIG. 37 and FIG. 38. In the twenty-first embodiment, one battery mount part 160A is provided on the lower surface of the lower connection part 103*b* of the motor housing 103. Further, one battery pack 170A is mounted on the battery mount part 160A by moving the battery pack 170A from the side of the hammer drill 100 (in a cross direction crossing both of the longitudinal direction of the hammer bit 119 and an extending direction of the hand grip 109).

According to the twenty-first embodiment, since an arrangement space for the battery pack 170A is reduced, a lower portion of the electric motor 110 can be shifted rearward. Therefore, as shown in FIG. 37, the rotational shaft of the electric motor 110 can be arranged so as to be perpendicular to the driving axis and thereby the motor housing 103 is formed more compactly to reduce the size the hammer drill 110. Further, apart from the above, similar advantages as the first embodiment can be obtained.

Twenty-Second Embodiment

Figure 39:
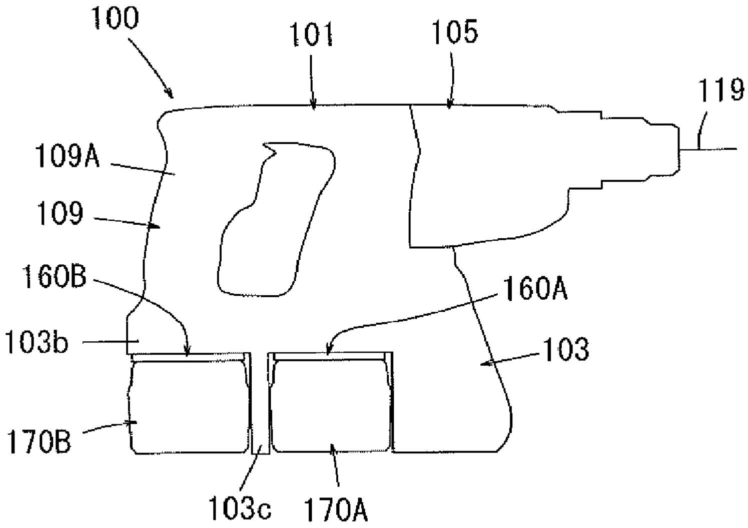
FIG. 39 shows a schematic view of a hammer drill and an arrangement of the battery packs with respect to the hammer drill of a twenty-second embodiment according to the present disclosure.

Next, a twenty-second embodiment of the present disclosure is explained with reference to FIG. 39. As shown in FIG. 39, according to the twenty-second embodiment, a vertical wall 103 extends downwardly at the center region of the lower surface of the lower connection part 103*b* of the motor housing 103. The vertical wall 103*c* is arranged between the front battery mount part 160A and the rear battery mount part 160B. The lower surface of the vertical wall 103*c* is formed flush with the lower surface of the hammer drill 100 (the lower surface of the motor housing 103). Otherwise, the construction of the twenty-second embodiment is similar to the hammer drill 100 according to the nineteenth embodiment.

According to the twenty-second embodiment, when the hammer drill 100 is placed on the ground, the vertical wall 103*c* is utilized as a stand (pedestal) together with the lower surface of the motor housing 103. Thus, the hammer drill 100 is stably placed. Further, apart from the above, similar advantages as the first embodiment can be obtained. In addition, in the twenty-second embodiment, the inserting directions of the battery packs 170A, 170B onto the battery mount parts 160A, 160B may be defined as the same directions to each other similar to the nineteenth embodiment or defined as the opposite directions to each other similar to the twentieth embodiment.

Twenty-Third Embodiment

Next, a twenty-second embodiment is explained with reference to FIG. 40. According to the twenty-second embodiment, in the fourth form of the hammer drill 100, the arrangement of the battery mount parts 160A, 160B is different from the hammer drill 100 according to the fifth embodiment. Constructions other than the battery mount parts 160A, 160B are similar to those in the hammer drill 100 according to the fifth embodiment, and therefore the same reference numerals are assigned and explanations thereof are omitted.

Figure 40:
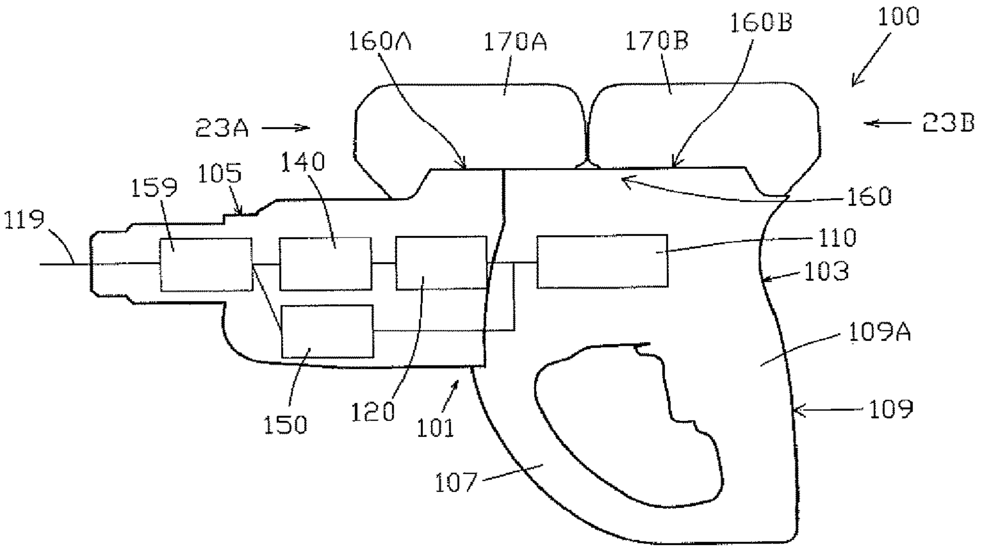
FIG. 40 shows a schematic view of a hammer drill and an arrangement of the battery packs with respect to the hammer drill of a twenty-third embodiment according to the present disclosure.

In the twenty-third embodiment, as shown in FIG. 40, the battery mount parts 160A, 160B are provided on an upper surface (upper side in FIG. 40) of the main body 101 in the direction in which the hand grip 109 extends. The one battery pack 170A is mounted on the one battery mount part 160A by sliding relative to the one battery mount part 160A in the direction of arrow 23A. On the other hand, the other battery pack 170B is mounted on the other battery mount part 160B by sliding relative to the battery mount part 160B in the direction of arrow 23B. The directions of arrows 23A and 23B are both parallel to the driving axis-extending direction along which the driving axis of the hammer bit 119 extends.

According to the twenty-third embodiment, with respect to the direction in which the hand grip 109 extends, the battery mount parts 160A, 160B are arranged upward of a region of the main body 101, to which the hand grip 109 is connected. Accordingly, a free space on the upper side of the main body 101 is effectively utilized.

Twenty-Fourth Embodiment

Next, a twenty-fourth embodiment is explained with reference to FIG. 41. According to the twenty-fourth embodiment, in the second form of the hammer drill 100, the arrangement of the battery mount part 160B is different from the hammer drill 100 according to the fifteenth embodiment. Constructions other than the battery mount part 160B are similar to those in the hammer drill 100 according to the fifteenth embodiment, and therefore the same reference numerals are assigned and explanations thereof are omitted.

Figure 41:
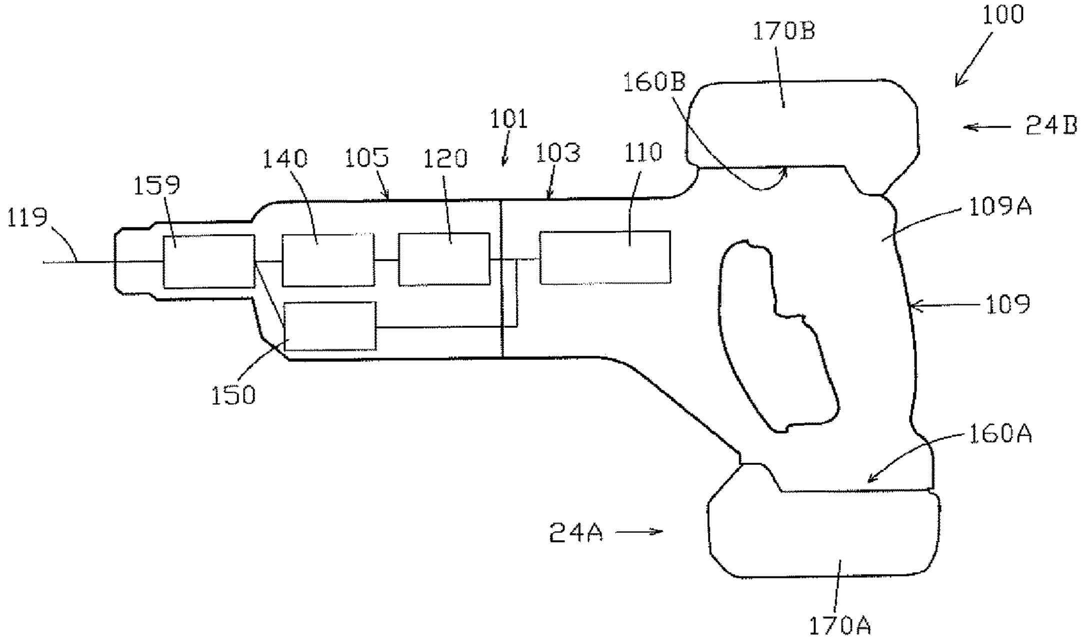
FIG. 41 shows a schematic view of a hammer drill and an arrangement of the battery packs with respect to the hammer drill of a twenty-fourth embodiment according to the present disclosure.

As shown in FIG. 41, in the twenty-fourth embodiment, with respect to a vertical direction in FIG. 41 in which the hand grip 109 extends, the one battery mount part 170A is arranged at a lower side of the main body 101 (lower side in FIG. 41) and the other battery mount part 170B is arranged at an upper side of the main body 101 (upper side in FIG. 41). Specifically, the one battery mount part 160A is arranged on the lower end part of the hand grip 109 and the other battery mount part 160B is arranged on the upper end part of the hand grip 109. The one battery pack 170A is mounted on the one battery mount part 160A by sliding relative to the battery mount part 160A in the direction of arrow 24A. On the other hand, the other battery pack 170B is mounted on the other battery mount part 160B by sliding relative to the other battery mount part 160B in the direction of arrow 24B. Thus, the directions of the arrows 24A and 24B are both parallel to the driving axis-extending direction along which the driving axis of the hammer bit 119 extends, wherein the direction of arrow 24A is a direction from the front to the rear of the hammer drill 100, and the direction of arrow 24B is a direction from the rear to the front of the hammer drill 100. Furthermore, in the twenty-fourth embodiment, although the attaching directions of the battery packs 170A, 170B are different directions to each other, the attaching directions of the battery packs 170A, 170B may be the same. On the other hand, the battery mount parts 160A, 160B may be formed such that the one battery pack 170A is slid in the direction of arrow 24B and mounted on the one battery mount part 160A, and the other battery pack 170B is slid in the direction of arrow 24A and mounted on the other battery mount part 160B.

Twenty-Fifth Embodiment

Next, a twenty-fifth embodiment is explained with reference to FIG. 42 and FIG. 43. According to the twenty-fifth embodiment, in the first form of the hammer drill 100, the arrangement of the battery mount parts 160A, 160B is different from the hammer drill 100 according to the first embodiment, and the hammer drill 100 according to the twenty-fifth embodiment further comprises an additional device mounting part 190. Constructions other than the arrangement of the battery mount parts 160A, 160B are similar to those in the hammer drill 100 according to the first embodiment, and therefore the same reference numerals are assigned and explanations thereof are omitted.

Figure 42:
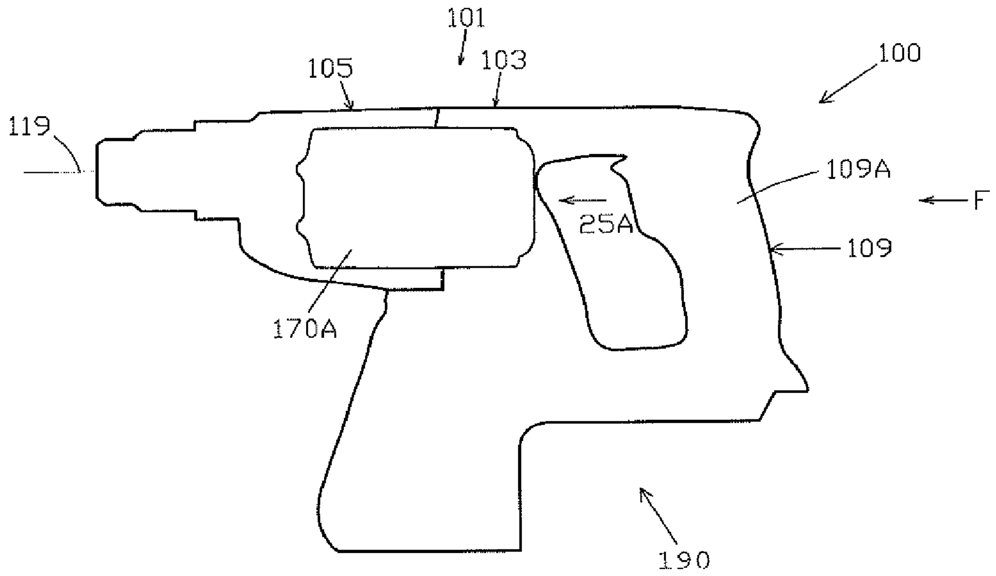
FIG. 42 shows a schematic view of a hammer drill and an arrangement of the battery packs with respect to the hammer drill of a twenty-fifth embodiment according to the present disclosure.
Figure 43:
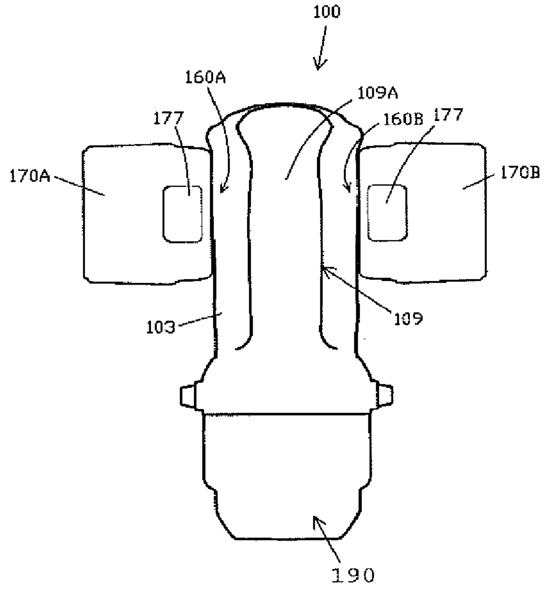
FIG. 43 shows a view of the hammer drill of FIG. 42 when viewed in the direction of arrow F in FIG. 42.

In the hammer drill 100 according to the twenty-fifth embodiment, the battery mount parts 160A, 160B are respectively arranged on both sides of the main body 101 in a direction (lateral direction in FIG. 43) crossing both of the longitudinal direction of the hammer bit 119 (lateral direction in FIG. 42) and the direction along which the hand grip 109 extends (the vertical direction in FIG. 42). The battery packs 170A, 170B are respectively mounted on the battery mount parts 160A, 160B by sliding relative to the battery mount parts 160A, 160B in the direction of arrow 25A shown in FIG. 42. Further, the direction of arrow 25A is parallel to the driving axis-extending direction along which the driving axis of the hammer bit 119 extends.

Further, in the twenty-fifth embodiment, the additional device mounting part 190 is formed at a lower part of the hand grip 109 and rearward of the motor housing 103. The additional device mounting part 190 comprises an engaging part (not shown). For example, a larger-sized battery pack, which is larger than the battery packs 170A, 170B, a dust collecting device, etc. may be mounted on the additional device mounting part 190. The larger-sized battery pack or the dust collecting device is engaged with the engaging part of the additional device mounting part 190 and held by the additional device mounting part 190.

Twenty-Sixth Embodiment

Figure 44:
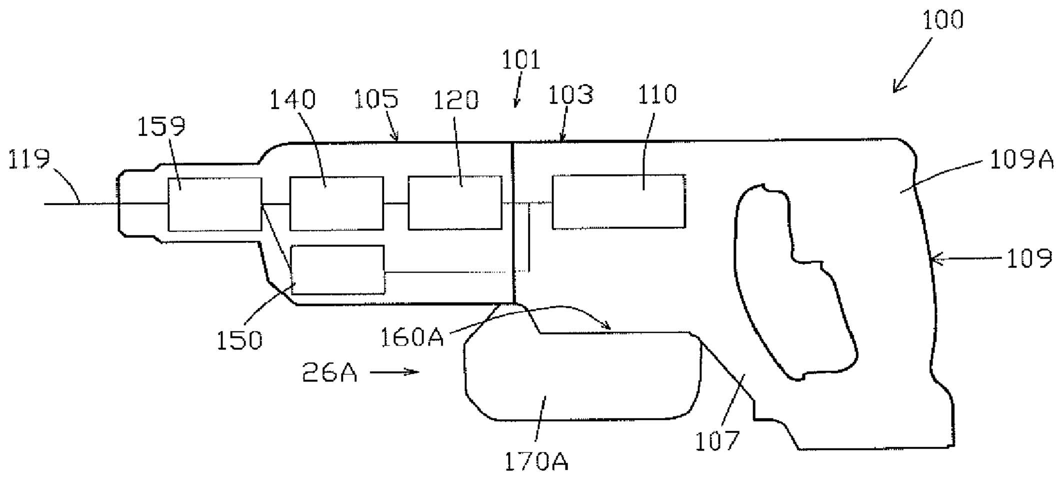
FIG. 44 shows a schematic view of a hammer drill and an arrangement of the battery packs with respect to the hammer drill of a twenty-sixth embodiment according to the present disclosure.

Next, a twenty-sixth embodiment is explained with reference to FIG. 44. According to the twenty-sixth embodiment, in the second form of the hammer drill 100, only one battery mount part that is different from the hammer drill 100 according to the fifteenth embodiment is provided. Constructions other than the battery mount part are similar to those in the hammer drill 100 according to the fifteenth embodiment, and therefore the same reference numerals are assigned and explanations thereof are omitted.

In the hammer drill 100 according to the twenty-sixth embodiment, the battery mount part 160A is arranged on the lower part of the main body 101 (lower part of the motor housing 103) and frontward of the hand grip 109 (support member 107). A battery pack 170A having a voltage required for driving the electric motor 110 is mounted on the battery mount part 160A. The battery pack 170A is mounted on the battery mount part 160A by sliding relative to the battery mount part 160A in the direction of arrow 26A. Further, the direction of arrow 26A is parallel to the driving axis-extending direction along which the driving axis of the hammer bit 119 extends.

According to the twenty-sixth embodiment, since the battery mount part 160A is provided on the motor housing 103, the center of gravity of the hammer drill 100 can be closer to the driving axis of the hammer bit 119. Further, a free space on the main body 101 of the hammer drill 100 and frontward of the hand grip 109 is effectively utilized.

Further, the arrangement of two battery mount parts 160A, 160B and the moving direction of the battery packs 170A, 170B while attaching may be utilized from combination of each aspect described in the first through twenty-sixth embodiments as needed.

Furthermore, in the first through twenty-sixth embodiments described above, although the mount part 160 is fixed on the main body 101 or the handgrip 109, it is not limited to this. For example, the mount part 160 may be attachable to or detachable from the main body 101 or the hand grip 109. Furthermore, the battery pack may be attached via a predetermined adapter to a region from which the mount part 160 is detached. Further, in the first through twenty-sixth embodiments, although two battery mount parts 160A, 160B are provided, three or more battery mount parts may be provided.

Further, in the first through twenty-sixth embodiments described above, as an example of the power tool, the hammer drill 100 in which the hammer bit 119 performs the hammering operation and the rotational operation is utilized for explanation; however the present disclosure is not limited to this type of power tool. For example, the present disclosure is applicable to a hammer tool which only performs the hammering operation as the power tool. Apart from that, as the power tool, the present disclosure is applicable to an electric driver, an electric wrench, an electric grinder, an electric reciprocating saw or an electric jigsaw.

Having regard to another aspect of the present disclosure, the following features are provided as additional power tools according to the present disclosure. Further, each feature may be utilized independently or in conjunction with other feature(s) or claimed invention(s).

(Feature 1)

A power tool which drives a detachably attached tool bit in a driving axis of the tool bit, comprising:

a motor which drives the motor, a tool body which houses the motor, a handle which is connected to the tool body, and a plurality of battery mount parts to which batteries for providing electric current to the motor are detachably mounted, wherein the power tool is configured to be able to provide electric current from a plurality of the batteries mounted on said plurality of battery mount parts to the motor, the handle is provided on a predetermined plane which includes the driving axis such that the handle extends in a handle-extending direction crossing (perpendicular to) a driving axis-extending direction in which the driving axis extends, each battery mount part comprises a battery engaging part with which the battery is engageable and holds the battery by engaging the battery with the battery engaging part, and the battery is slid relative to the battery engaging part in a normal (perpendicular) direction of the predetermined plane to be mounted on the battery mount parts.

(Feature 2)

The battery engaging part comprises a guide rail on which the battery is engaged and slid.

(Feature 3)

The guide rail of the battery engaging part is provided so as to extend in a direction crossing both of the driving axis-extending direction and the handle-extending direction.

(Feature 4)

The tool body has a tool body lower surface which is flush with the lower surface of the batteries when the batteries are mounted on the battery mount part.

(Feature 5)

A plurality of the battery mount parts are electrically connected to each other such that the mounted batteries are electrically connected in series.

(Feature 6)

A plurality of the battery mount parts are electrically connected to each other such that the mounted batteries are electrically connected in parallel.

(Feature 7)

A plurality of the battery mount parts are electrically connected to each other such that a first connecting mode in which the mounted batteries are electrically connected in series and a second connecting mode in which the mounted batteries are electrically connected in parallel are switchable.

(Feature 8)

A power tool which drives a detachably attached tool bit in a driving axis of the tool bit, comprising:

a motor which drives the tool bit, a tool body which houses the motor, and a battery mount part to which a battery for providing electric current is detachably mounted, wherein the power tool comprises two battery mount parts and can provide electric current from the battery mounted to the battery mount part to the motor, the two battery mount parts are aligned on a straight line extending in a predetermined direction, each of the battery mount parts comprises a battery engaging part and holds the respective battery by engaging the battery with the battery engaging part, one of the batteries is mounted on one of the two battery mount parts by sliding the battery on the battery engaging part in a direction such that the battery approaches the other battery mount part, and the other battery is mounted on the other of the two battery mount parts by sliding the other battery on the battery engaging part in a direction in which the other battery approaches the one battery mount part.

(Feature 9)

The power tool according to feature 8, wherein the predetermined direction is defined as a direction parallel to the driving axis.

(Feature 10)

The power tool according to feature 8 or 9, further comprising a handle which is connected to the tool body, wherein the handle extends in a handle-extending direction crossing the driving axis, at least one end side of the handle in the handle extending direction is connected to the tool body, and the two battery mount parts are arranged on the other end side of the handle in the handle-extending direction.

(Feature 11)

The power tool according to feature 8 or 9, further comprising a handle which is connected to the tool body, wherein the handle extends in a handle-extending direction crossing the driving axis, at least one end side of the handle in the handle extending direction is connected to the tool body, and the two battery mount parts are arranged on the tool body at said one end side of the handle in the handle extending direction.

(Feature 12)

The power tool according to any one of features 8 to 11, wherein the motor is arranged such that a rotational axis of a rotary shaft of the motor intersects the driving axis.

(Feature 13)

The power tool according to any one of features 8 to 11, wherein the motor is arranged such that a rotational axis of a rotary shaft of the motor is parallel to the driving axis.

(Feature 14)

The power tool according to feature 10 or 11, wherein the motor is arranged such that a rotational axis of a rotary shaft of the motor is parallel to the driving axis, the handle includes a grip portion which is held by a user, and the grip portion is arranged on the driving axis line.

(Feature 15)

The power tool according to feature 10 or 11, wherein the motor is arranged such that a rotational axis of a rotary shaft of the motor is parallel to the driving axis, the handle includes a grip portion having one end side connected to the tool body and a reinforcing member which further connects the other end side of the grip portion and the tool body.

(Feature 16)

The power tool according to any one of features 8 to 15, wherein two batteries are mounted on said two battery mount parts respectively such that a front surface of one battery with respect to a sliding direction of said one battery against the battery engaging part when said one battery is mounted to one battery mount part and a front surface of another battery with respect to a sliding direction of said another battery against the battery engaging part when said another battery is mounted to another battery mount part face each other.

(Feature 17)

A power tool which drives a detachably attached tool bit in a driving axis of the tool bit, comprising:

a motor which drives the tool bit, a tool body which houses the motor, a handle which is connected to the tool body, and a battery mount part to which a battery for providing electric current is detachably mounted, wherein the power tool comprises two battery mount parts and can provide electric current from the battery mounted to the battery mount part to the motor, and said two battery mount parts are respectively arranged at two points, between which the tool body and/or the handle are/is arranged, and are spaced-apart thereby.

(Feature 18)

The power tool according to feature 17, wherein the handle extends in a handle-extending direction crossing a driving axis-extending direction in which the driving axis extends, and at least one end side of the handle in the handle-extending direction is connected to the tool body, and one of the two battery mount parts is arranged at the other end side of the handle in the handle-extending direction.

(Feature 19)

The power tool according to feature 18, wherein the other of the two battery mount parts is arranged on the tool body at one side of the tool body in the handle-extending direction.

(Feature 20)

The power tool according to feature 19, wherein said other battery mount part is arranged on the tool body at the same side with respect to the driving axis as said one battery mount part.

(Feature 21)

The power tool according to any one of features 18 to 20, wherein the motor is arranged such that a rotational axis of a rotary shaft of the motor is parallel to the driving axis.

(Feature 22)

The power tool according to feature 21, wherein the handle comprises a grip portion which is held by a user, and the grip portion is arranged on a driving axis line.

(Feature 23)

The power tool according to feature 21, wherein the handle comprises a grip portion having one end side connected to the tool body and a reinforcing member which connects the other end side of the grip portion and the tool body, and the other battery mount part is arranged on the reinforcing member.

(Feature 24)

The power tool according to feature 18, wherein the motor is arranged such that a rotational axis of a rotary shaft of the motor intersects the driving axis, and the other battery mount part is arranged at a side opposite to said one battery mount part with respect to the motor in the driving axis-extending direction.

(Feature 25)

The power tool according to feature 17, wherein the handle extends in a handle-extending direction crossing a driving axis extending direction in which the driving axis extends, and said two battery mount parts are respectively arranged on both sides of the tool body in a cross direction crossing both of the driving axis-extending direction and the handle-extending direction.

(Feature 26)

The power tool according to any one of features 17 to 21, wherein said two battery mount parts are arranged so as to be mutually separated with respect to the direction in which the driving axis extends.

(Feature 27)

The power tool according to any one of features 17 to 21, wherein said two battery mount parts are arranged so as to be mutually separated with respect to a direction crossing the direction in which the driving axis extends.

(Feature 28)

The power tool according to any one of features 17 to 27, wherein each of the battery mount parts comprises a battery engaging part and holds the battery by engaging the respective battery with the battery engaging part, the battery engaging part extends in a direction parallel to a virtual plane that includes the driving axis and a handle-extending axis of the handle which extends in the handle-extending direction, and the battery is mounted to the battery mount part by sliding relative to the battery engaging part in a direction parallel to the virtual plane.

(Feature 29)

The power tool according to any one of features 17 to 28, wherein the batteries to be mounted on the battery mount parts have an elongate-shape which extends in a predetermined longitudinal direction, and said two battery mount parts are formed such that the longitudinal direction of the one battery mounted on one of the two battery mount parts and the longitudinal direction of the other battery mounted on the other battery mount part are parallel to each other.

(Feature 30)

The power tool according to any one of features 17 to 28, wherein the batteries to be mounted on the battery mount parts have an elongate-shape which extends in a predetermined longitudinal direction, and said two battery mount parts are formed such that the longitudinal direction of the battery mounted on one of the two battery mount parts and the longitudinal direction of the other battery mounted on the other battery mount part intersect each other.

(Feature 31)

A hammering tool which drives a tool bit at least linearly along a driving axis extending in a predetermined longitudinal direction, comprising:

a motor which drives the tool bit, a tool body which houses the motor, a handle which is connected to the tool body, and a battery mount part to which a battery for providing electric current to the motor is detachably attached, wherein the hammering tool comprises a plurality of the battery mount parts, the handle is provided such that it extends in a handle-extending direction crossing the longitudinal direction, and the battery mount parts are fixed on the tool body and are undetachable from the hammering tool.

(Feature 32)

The hammering tool according to feature 31, wherein the battery mount parts each comprise a battery engaging part with which one of the batteries is engageable and the battery mount part holds the battery by engaging the battery with the battery engaging part, the battery is slid relative to the battery engaging part to be mounted on the battery mount part.

(Feature 33)

The hammering tool according to feature 32, wherein a plurality of the battery engaging parts are provided such that the batteries are attached by moving each battery in the same direction.

(Feature 34)

The hammering tool according to feature 32 or 33, wherein the battery mount parts are arranged to be aligned in the longitudinal direction, and each battery is attached by moving in a cross direction crossing both of the longitudinal direction and the handle-extending direction.

(Feature 35)

The hammering tool according to feature 32 or 33, wherein the battery mount parts are arranged to be aligned in a cross direction crossing both of the longitudinal direction and the handle-extending direction, and each battery is attached by moving in a direction parallel to the longitudinal direction.

(Feature 36)

The hammering tool according to feature 32, wherein two of the battery mount parts are aligned on a line which extends in a predetermined direction, one of the batteries is attached to one of the two battery mount parts by sliding relative to the battery engaging part in a direction close to the other battery mount part, and the other battery is attached to the other battery mount part by sliding relative to the battery engaging part in a direction close to the one battery mount part.

(Feature 37)

The hammering tool according to any one of features 32 to 36, wherein the batteries are attached to the battery mount parts by sliding relative to the battery engaging parts in a cross direction that crosses both of the longitudinal direction and the handle-extending direction.

(Feature 38)

The hammering tool according to any one of features 31 to 37, wherein two of the battery mount parts are arranged at two points, between which the tool body and/or the handle are/is arranged, and are separated thereby.

(Feature 39)

The hammering tool according to any one of features 31 to 38, wherein the motor is arranged such that a rotational axis of a rotary shaft of the motor is parallel to the driving axis.

(Feature 40)

The hammering tool according to feature 39, wherein the handle comprises a grip portion which is held by a user, and the grip portion is arranged on a driving axis line.

(Feature 41)

The hammering tool according to feature 39 or 40, wherein the handle comprises a grip portion having one end side connected to the tool body and a reinforcing member which connects the other end side of the grip portion and the tool body, and at least one of the battery mount parts is arranged on the reinforcing member.

(Feature 42)

The hammering tool according to any one of features 31 to 37, wherein the motor is arranged such that a rotational axis of a rotary shaft of the motor intersects the driving axis.

(Feature 43)

The hammering tool according to any one of features 38 to 42, wherein two of the battery mount parts are arranged respectively on both sides of the tool body in a cross direction that crosses both of the longitudinal direction and the handle-extending direction.

(Feature 44)

A hammering tool which drives a tool bit at least linearly on a driving axis extending in a predetermined longitudinal direction, comprising:

a motor which drives the tool bit, a tool body which houses the motor, a handle which is connected to the tool body, and a mount part to which a battery for providing electric current to the motor is detachably mounted, wherein the handle extends in a handle-extending direction that crosses the longitudinal direction, the mount part comprises a battery engaging part with which the battery is engageable and the mount part holds the battery by engaging the battery with the battery engaging part, and the battery is slid in a cross direction, which crosses both of the longitudinal direction and the handle-extending direction, relative to the battery engaging part to mount the battery on the mount part.

(Feature 45)

The hammering tool according to feature 44, wherein the mount part is provided such that the center of gravity of the battery mounted on the mount part is located on a plane that includes the driving axis and a handle central axis which extends in the handle-extending direction.

(Feature 46)

The hammering tool according to feature 44 or 45, wherein the mount part comprises a plurality of battery mount parts to which a plurality of batteries is detachably mounted respectively, and said battery mount parts are arranged so as to be aligned in the longitudinal direction.

(Feature 47)

The hammering tool according to feature 46, further comprising a partition wall which is arranged between at least two of the battery mount parts and extends in the handle-extending direction, wherein a vertical direction is defined by the handle-extending direction, and a lower surface of the partition wall is flush with a lower surface of the tool body.

(Feature 48)

The hammering tool according to feature 46 or 47, wherein the mount part comprises an even number of the battery mount parts on which an even number of the batteries are detachably mounted, one of the batteries is mounted to a half number of the battery mount part among said even number of the battery mount parts by sliding the battery relative to the battery engaging part in one direction, and the other battery is mounted to the rest of a half of the battery mount part among said even number of the battery mount parts by sliding the battery relative the battery engaging part in a direction opposite to said one direction.

(Feature 49)

The hammering tool according any one of features 46 to 48, wherein the mount part comprises an even number of the battery mount parts on which an even number of the batteries are detachably mounted, and each battery mount part positioned next to another is formed such that the battery is mounted on the battery mount part by moving in an opposite direction, which is opposite to the direction in which the battery is moved when it is mounted on the other battery mount part next to said battery mount part.

(Feature 50)

The hammering tool according to any one of features 46 to 49, wherein said plurality of battery mount parts is formed such that the combined center of gravity of the plurality of the batteries mounted on said plurality of battery mount parts is located on a plane that includes the driving axis and a handle central axis which extends in the handle-extending direction.

(Feature 51)

The hammering tool according to any one of features 44 to 50, wherein the motor is arranged such that a rotational axis of a rotary shaft of the motor intersects the driving axis.

(Correspondence Relationships Between Constituent Elements of the Present Embodiments and Constituent Elements of the Present Disclosure)

The correspondence relationships between elements of the embodiments and elements of the present disclosure are as follows. Further, the embodiments merely describe examples of configurations for carrying out the present invention, and the present invention is not limited to the configurations of the embodiments.

The main body 101 is one example of a configuration that corresponds to “a tool body” of the present disclosure.

The hammer bit 119 is one example of a configuration that corresponds to “a tool bit” of the present disclosure.

The electric motor 110 is one example of a configuration that corresponds to “a motor” of the present disclosure.

The two battery mount parts 160A, 160B are one example of a configuration that corresponds to “a plurality of battery mount parts” of the present disclosure.

The battery mount part 160A is one example of a configuration that corresponds to “a battery mount part” of the present disclosure.

The battery mount part 160B is one example of a configuration that corresponds to “a battery mount part” of the present disclosure.

The battery pack 170A is one example of a configuration that corresponds to “a battery” of the present disclosure.

The battery pack 170B is one example of a configuration that corresponds to “a battery” of the present disclosure.

The guide rail 161 is one example of a configuration that corresponds to “a battery engaging part” of the present disclosure.

The engagement part 163 is one example of a configuration that corresponds to “a battery engaging part” of the present disclosure.

The rubber pin 167 is one example of a configuration that corresponds to “an elastic member” of the present disclosure.

The support member 107 is one example of a configuration that corresponds to “a reinforcing member” of the present disclosure.

DESCRIPTION OF REFERENCE NUMERALS

100 hammer drill
101 main body
103 motor housing
103*a* upper connection part
103*b* lower connection part
103*c* vertical wall

104 elastomer
105 gear housing
107 support member
109 hand grip
109A grip portion
109*a* trigger
110 electric motor
111 motor shaft
119 hammer bit
120 motion converting mechanism
121 intermediate shaft
123 rotation member
125 swing member
127 cylindrical piston
127*a* air chamber
129 cylinder
130 controller
140 hammering mechanism
143 striker
145 impact bolt
150 power transmitting mechanism
151 first gear
153 second gear
159 tool holder
160 mount part
160A battery mount part
160B battery mount part
161 guide rail
163 engagement part
165 terminal
167 rubber pin
170A battery pack
170B battery pack
171 battery case
173 mount guide
175 hook for locking
177 press button for unlocking
179 terminal
180 cover member
181 support shaft
183 engagement recess
185 engagement protrusion
190 additional device mounting part

The invention claimed is:

1. A power tool configured to reciprocally drive a detachably attached tool bit along a driving axis of the tool bit, comprising:

a motor configured to generate a rotational output that is operationally output to at least reciprocally drive the tool bit, a tool body which houses the motor, and first and second battery mount parts provided on the tool body and configured to supply electric current from first and second batteries respectively detachably mounted thereon to the motor, wherein:

the first and second battery mount parts are aligned along a straight line, the first battery mount part includes a first battery engaging part configured to engage the first battery, the second battery mount part includes a second battery engaging part configured to engage the second battery, the first battery is mountable on the first battery mount part by sliding the first battery along the first battery engaging part in a first direction towards the second battery mount part, and the second battery is mountable on the second battery mount part by sliding the second battery along the second battery engaging part in a second direction towards the first battery mount part.

2. The power tool according to claim 1, wherein the straight line is parallel to the driving axis.

3. The power tool according to claim 1, further comprising:

a handle connected to the tool body, wherein:

the handle extends along a handle extension direction that crosses the driving axis, at least a first end portion of the handle in the handle extension direction is connected to the tool body, and the first and second battery mount parts are provided at a second end portion of the handle that is opposite of the first end portion of the handle in the handle extension direction.

4. The power tool according to claim 3, wherein:

the motor is arranged in the housing such that a rotational axis of the motor is parallel to or colinear with the driving axis, the handle includes a grip portion configured to be held by a user to operate the power tool, and the driving axis intersects the grip portion.

5. The power tool according to claim 3, wherein:

the motor is arranged in the tool body such that a rotational axis of the motor is parallel to the driving axis, the handle includes a grip portion having a first end portion and a second end portion that is opposite of the first end portion of the handle in a handle extension direction, and the first end portion is directly connected to the tool body and the second end portion is connected to the tool body via a reinforcing member.

6. The power tool according to claim 1, further comprising:

a handle connected to the tool body, wherein:

the straight line is parallel to the driving axis, the handle extends along a handle extension direction that crosses the driving axis, at least a first end portion of the handle in the handle extension direction is connected to the tool body, and the first and second battery mount parts are provided at a second end portion of the handle that is opposite of the first end portion of the handle in the handle extension direction.

7. The power tool according to claim 1, further comprising:

a handle connected to the tool body, wherein:

the handle extends along a handle extension direction that crosses the driving axis, at least a first end portion of the handle in the handle extension direction is directly connected to the tool body, a second end portion of the handle is opposite of the first end portion of the handle in the handle extension direction, and the first and second battery mount parts are disposed closer to the first end portion than to the second end portion.

8. The power tool according to claim 1, further comprising:

a handle connected to the tool body, wherein:

the straight line is parallel to the driving axis, the handle extends along a handle extension direction that crosses the driving axis, at least a first end portion of the handle in the handle extension direction is connected to the tool body, a second end portion of the handle is opposite of the first end portion of the handle in the handle extension direction, and the first and second battery mount parts are disposed closer to the first end portion than to the second end portion.

9. The power tool according to claim 1, wherein the motor is arranged in the tool body such that a rotational axis of the motor intersects the driving axis.

10. The power tool according to claim 1, wherein the motor is arranged in the tool body such that a rotational axis of the motor is parallel to the driving axis.

11. A power tool configured to reciprocally drive a detachably attached tool bit along a driving axis of the tool bit, comprising:

a motor configured to generate a rotational output that is operationally output to at least reciprocally drive the tool bit, a tool body which houses the motor, a handle having a first end connected to the tool body, and first and second battery mount parts provided on the tool body proximal to the first end or proximal to a second end of the handle that is distal to the first end, the first and second battery mount parts being configured to supply electric current from first and second batteries respectively detachably mounted thereon to the motor, wherein:

the first and second battery mount parts are aligned along a straight line that is parallel to the driving axis, the first battery mount part includes a first battery engaging part configured to engage the first battery, the second battery mount part includes a second battery engaging part configured to engage the second battery, the first battery is mountable on the first battery mount part by sliding the first battery on the first battery engaging part in a direction towards the second battery mount part, and the second battery is mountable on the second battery mount part by sliding the second battery on the second battery engaging part in a direction towards the first battery mount part.

12. The power tool according to claim 11, wherein:

the handle extends along a handle extension direction that crosses the driving axis, and the first and second battery mount parts are closer to the second end of the handle than to the first end of the handle.

13. A power tool, comprising:

a tool body, a motor disposed in the tool body and configured to generate a rotational output that is operationally output to at least reciprocally drive a tool holder configured to hold a tool bit, and first and second battery mount parts provided on the tool body and electrically connected to the motor, wherein:

the first and second battery mount parts are aligned along a straight line, and the first and second battery mount parts are configured such that:

a first battery is mountable on the first battery mount part by sliding the first battery along the straight line towards the second battery mount part, and a second battery is mountable on the second battery mount part by sliding the second battery along the straight line towards the first battery mount part.

14. The power tool according to claim 13, wherein:

the first battery mount part comprises a first pair of guide rails for slidably engaging the first battery, the second battery mount part comprises a second pair of guide rails for slidably engaging the second battery, and the first and second pair of guide rails extend in parallel with the straight line.

15. The power tool according to claim 14, wherein the tool holder is configured to be reciprocated along a driving axis that is parallel to the straight line.

16. The power tool according to claim 15, further comprising:

a handle connected to the tool body, wherein:

the handle extends along a handle extension direction that crosses the driving axis, at least a first end portion of the handle in the handle extension direction adjoins the tool body, and the first and second battery mount parts are provided at a second end portion of the handle that is distal to the first end portion of the handle in the handle extension direction.

17. The power tool according to claim 16, wherein:

the handle includes a grip portion configured to be held by a user while operating the power tool, the grip portion is disposed between the first and second end portions of the handle, and the driving axis intersects the first end portion or the grip portion.

18. The power tool according to claim 17, wherein the second end portion of the handle is connected to the tool body via a reinforcing member.

19. The power tool according to claim 18, wherein:

the first and second batteries each have a hook and press button configured to mechanically latch to the respective first and second battery mount parts, the hook and press button are disposed closer to a first longitudinal end of each of the first and second batteries than to a second longitudinal end of each of the batteries, the second longitudinal end being opposite of the first longitudinal end in a longitudinal direction of each of the first and second batteries, the first and second battery mount parts are configured such that, when the first and second batteries are respectively mounted on the first and second battery mount parts, the first longitudinal end of the first battery is spaced apart from the first longitudinal end of the second battery by a first distance and the second longitudinal end of the first battery is spaced apart from the second longitudinal end of the second battery by a second distance, and the first distance is longer than the second distance.

20. The power tool according to claim 19, further comprising:

a motion converting mechanism configured to convert the rotational output of the motor into a reciprocating linear movement, and a hammering mechanism configured to convert the reciprocating linear movement into repetitive impacts on the tool holder in the direction of the driving axis.

* * * * *